(12) United States Patent  (10) Patent No.: US 9,127,791 B2
Ragner  (45) Date of Patent: Sep. 8, 2015

(54) LUBRICATED ELASTICALLY BIASED STRETCH HOSES

(71) Applicant: Ragner Technology Corporation, Newberry, FL (US)

(72) Inventor: Gary Dean Ragner, Gainesville, FL (US)

(73) Assignee: Ragner Technology Corporation, Newberry, FL (US)

( * ) Notice: Subject to any disclaimer, the term of this patent is extended or adjusted under 35 U.S.C. 154(b) by 0 days.

(21) Appl. No.: 14/491,735

(22) Filed: Sep. 19, 2014

(65) Prior Publication Data

US 2015/0007902 A1   Jan. 8, 2015

Related U.S. Application Data

(63) Continuation-in-part of application No. 14/075,963, filed on Nov. 8, 2013, now Pat. No. 8,936,046, and a continuation-in-part of application No. 14/455,461, filed on Aug. 8, 2014.

(Continued)

(51) Int. Cl.
*F16L 11/00* (2006.01)
*F16L 11/118* (2006.01)
*D03D 3/02* (2006.01)
*D03D 3/06* (2006.01)

(52) U.S. Cl.
CPC .............. *F16L 11/118* (2013.01); *D03D 3/02* (2013.01); *D03D 3/06* (2013.01)

(58) Field of Classification Search
CPC .......... D04C 1/06; D04C 1/02; B05B 5/1608; F16L 11/12

USPC ............ 138/118, 119, 122; 15/314, 315, 414, 15/321; 239/280.5, 208, 281
See application file for complete search history.

(56) References Cited

U.S. PATENT DOCUMENTS

| 2,396,059 A | 3/1946 | Leo et al. |
| 2,867,833 A | 1/1959 | Duff |
| 2,927,625 A | 3/1960 | Rothermel et al. |
| 2,954,802 A | 10/1960 | Duff |
| 3,028,290 A | 4/1962 | Roberts et al. |
| 3,050,087 A | 8/1962 | Caplan |

(Continued)

FOREIGN PATENT DOCUMENTS

| DE | 26 02 502 A | 7/1976 |
| DE | 197 38 329 A | 3/1999 |

(Continued)

OTHER PUBLICATIONS

International Search Report and Written Opinion dated Feb. 13, 2014 for Application No. PCT/US2013/069301.

(Continued)

*Primary Examiner* — Patrick F Brinson
(74) *Attorney, Agent, or Firm* — Frost Brown Todd LLC

(57) ABSTRACT

A retractable pressure hose can be created which comprises an inlet connector, an outlet connector, an inner elastic tube, an outer cover, and a lubricant disposed to reducing chafing between the inner elastic tube and the outer cover. In such a hose, the lubricant can comprise a solid lubricant such as paraffin wax or other slippery solids, a liquid lubricant such as olive oil or other slippery liquids, or a combination of solid and/or liquid lubricants.

22 Claims, 5 Drawing Sheets

Related U.S. Application Data

(60) Provisional application No. 61/724,890, filed on Nov. 9, 2012, provisional application No. 61/732,291, filed on Dec. 1, 2012, provisional application No. 61/856,054, filed on Jul. 19, 2013, provisional application No. 61/864,555, filed on Aug. 10, 2013, provisional application No. 62/039,913, filed on Aug. 21, 2014.

(56) References Cited

U.S. PATENT DOCUMENTS

| | | |
|---|---|---|
| 3,288,169 A | 11/1966 | Moss |
| 3,353,996 A | 11/1967 | Hamrick |
| 3,486,532 A | 12/1969 | Sawada |
| 3,520,725 A | 7/1970 | Hamrick |
| 3,623,500 A | 11/1971 | Hoy |
| 3,642,034 A * | 2/1972 | Ullman et al. ............. 138/144 |
| 3,861,424 A | 1/1975 | Mizutani et al. |
| 3,953,270 A * | 4/1976 | Ford ............................ 156/80 |
| 3,966,121 A | 6/1976 | Littman |
| 4,009,734 A | 3/1977 | Sullivan |
| 4,050,113 A | 9/1977 | Wright et al. |
| 4,096,888 A | 6/1978 | Stefano et al. |
| 4,136,149 A | 1/1979 | Payne |
| 4,704,765 A | 11/1987 | Ataka |
| 4,955,106 A | 9/1990 | Stein et al. |
| 5,023,959 A | 6/1991 | Mercer |
| 5,036,890 A | 8/1991 | Whaley |
| 5,156,349 A | 10/1992 | Wilson et al. |
| 5,485,870 A | 1/1996 | Kraik |
| 5,526,842 A | 6/1996 | Christensen |
| 5,555,915 A | 9/1996 | Kanao |
| 5,607,107 A | 3/1997 | Grieve et al. |
| 5,740,851 A | 4/1998 | Haynes |
| 5,778,941 A | 7/1998 | Inada |
| 5,780,581 A | 7/1998 | Hermansen et al. |
| 6,024,132 A | 2/2000 | Fujimoto |
| 6,024,134 A | 2/2000 | Akedo et al. |
| 6,098,666 A | 8/2000 | Wells et al. |
| 6,182,327 B1 | 2/2001 | Gosselin |
| 6,186,181 B1 | 2/2001 | Schippl |
| 6,223,777 B1 | 5/2001 | Smith et al. |
| 6,382,241 B1 | 5/2002 | Setrum |
| 6,523,539 B2 | 2/2003 | McDonald et al. |
| 6,607,010 B1 | 8/2003 | Kashy |
| 6,948,527 B2 | 9/2005 | Ragner et al. |
| 6,983,757 B1 | 1/2006 | Becker et al. |
| 7,156,127 B2 | 1/2007 | Moulton et al. |
| 7,325,028 B1 * | 1/2008 | Smith et al. ................. 709/202 |
| 7,398,798 B2 | 7/2008 | Ostan et al. |
| 7,520,302 B2 | 4/2009 | Smith |
| 7,549,448 B2 | 6/2009 | Ragner |
| 8,291,941 B1 * | 10/2012 | Berardi ......................... 138/118 |
| 8,291,942 B2 | 10/2012 | Berardi |
| 8,479,776 B2 | 7/2013 | Berardi |
| 8,776,836 B2 | 7/2014 | Ragner et al. |
| 8,936,046 B2 | 1/2015 | Ragner |
| 2002/0013974 A1 | 2/2002 | Gibson et al. |
| 2003/0098084 A1 * | 5/2003 | Ragner et al. ............... 138/129 |
| 2004/0231096 A1 | 11/2004 | Battle et al. |
| 2005/0069703 A1 * | 3/2005 | He et al. ....................... 428/395 |
| 2005/0093205 A1 * | 5/2005 | Martin et al. ................ 264/326 |
| 2006/0070679 A1 * | 4/2006 | Ragner ......................... 138/119 |
| 2009/0071400 A1 * | 3/2009 | Soyland et al. .............. 118/323 |
| 2010/0108170 A1 | 5/2010 | Chudkosky et al. |
| 2014/0057103 A1 * | 2/2014 | Mozsgai et al. ............. 428/365 |

FOREIGN PATENT DOCUMENTS

| | | |
|---|---|---|
| FR | 0 965 689 A | 7/1977 |
| FR | 2 336 624 A | 7/1977 |
| GB | 982 951 | 2/1965 |
| GB | 1 551 429 | 8/1979 |
| GB | 2 310 369 A | 8/1997 |
| JP | 2002-206670 | 7/2002 |
| WO | WO 85/00277 | 1/1985 |
| WO | WO 99/35954 | 7/1999 |
| WO | WO 2003/024294 | 3/2003 |
| WO | WO 2012/122601 | 9/2012 |

OTHER PUBLICATIONS

US Office Action dated Feb. 26, 2007 for U.S. Appl. No. 11/343,602.
US Office Action dated Apr. 30, 2008 for U.S. Appl. No. 11/343,602.
US Office Action dated Mar. 16, 2012 for U.S. Appl. No. 11/343,602.
US Office Action dated Jun. 13, 2013 for U.S. Appl. No. 11/343,602.
Notice of Allowability dated Feb. 25, 2009 for U.S. Appl. No. 11/234,944.
U.S. Appl. No. 60/335,497, filed Nov. 24, 2001.
U.S. Appl. No. 60/648,638, filed Jan. 29, 2005.
U.S. Appl. No. 60/739,323, filed Nov. 23, 2005.

* cited by examiner

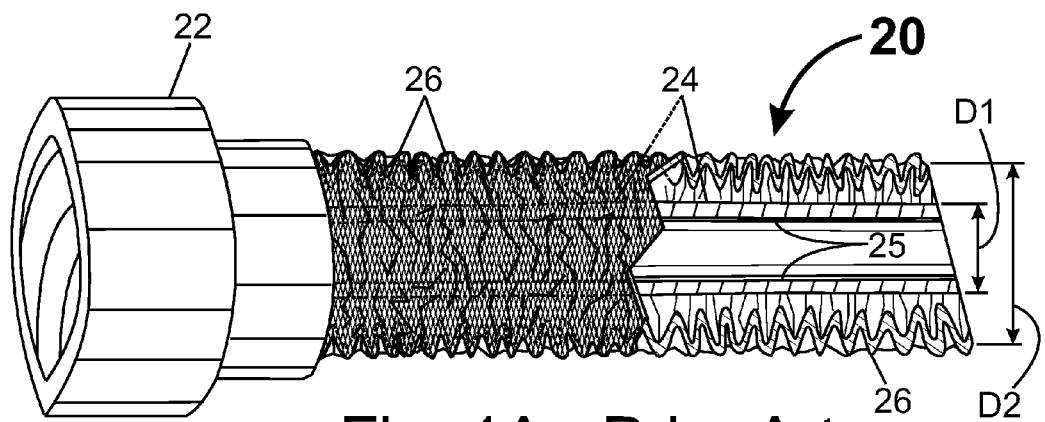
Fig. 1A - Prior Art
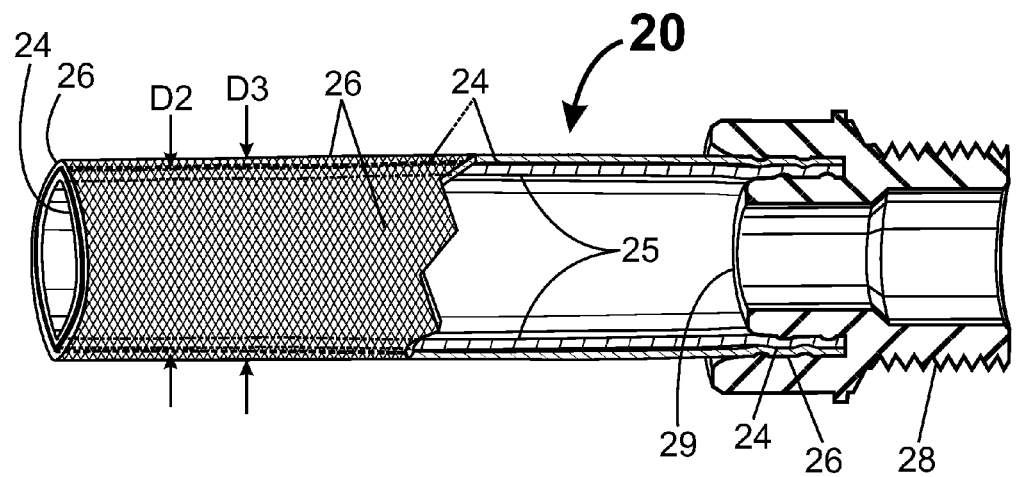
Fig. 1B - Prior Art

LUBRICATED ELASTICALLY BIASED
STRETCH HOSES

CROSS REFERENCE TO RELATED
APPLICATIONS

The present application is:
a) a continuation in part of U.S. application Ser. No. 14/075,963 filed on Nov. 8, 2013, which is itself a non-provisional of U.S. provisional patent applications 61/724,890, 61/732,291 and 61/856,054, filed, respectively, on Nov. 9, 2012, Dec. 1, 2012, and Jul. 19, 2013;
b) a continuation in part of U.S. application Ser. No. 14/455,461 filed on Aug. 8, 2014, which is itself a non-provisional of U.S. provisional patent application 61/864,555, filed on Aug. 10, 2013;
c) a non-provisional of provisional application 61/856,054 filed on Jul. 19, 2013; and
d) a non-provisional of provisional application 62/039,913 filed on Aug. 21, 2014;
of which applications, application Ser. Nos. 14/075,963, 14/455,461, and provisional applications 61/724,890, 61/732,291, 61/856,054 and 62/039,913 are hereby incorporated by reference in their entirety, including any figures, tables, equations or drawings.

BACKGROUND OF INVENTION

The field of this invention relates to hoses or conduits for transporting pressurized fluids and gasses, and more specifically to hoses or conduits that extend linearly when pressurized, and retract linearly when internal pressure is removed.

BACKGROUND

Prior Art

The present state of the art linearly extendable and retractable hoses includes both spring biased and elastic based extendable and retractable hoses. Examples of both spring biased and elastic biased extendable and retractable hoses can be found in U.S. Pat. No. 7,549,448 for a "Linearly Retractable Pressure Hose" to Ragner, which discloses using coiled spring (usually made of either high-carbon steel or stainless steel) designs as well as designs which use an elastic biasing means (either in addition to or as an alternative to a spring biasing means) to provide the retracting force for the hose. In recent years a number of elastic-biased retractable hoses have been sold under the trade names "X-Hose®", "Pocket Hose®", and "Flex-Able® Hose". Designs of this type are illustrated in FIGS. 1A and 1B, where a reinforced outer cover 26 (reinforcement tube, fabric tube, woven sleeve, etc.) is used to provide radial pressure strength, as well as, longitudinal support to prevent over-stretching of an inner hose 24 (inner elastic tube) beyond a designed elastic limit. However, these elastically retractable hose designs have a number of design problems that create significant wear on the inner hose during use. Accordingly, there is a need for technology which can be used to improve the durability of existing elastic-biased retractable hose designs.

SUMMARY

This document describes how a lubricant can be used between the inner elastic tube and the woven reinforcement cover of an elastically biased extendable and retractable stretch hose (retractable hose) to significantly reduce wear and also reduce stresses on the inner elastic tube of the stretch hose. This can be achieved using a lubricant that is either a solid lubricant (e.g., paraffin wax), or a liquid lubricant (e.g. oil). Such lubricants can allow an inner elastic tube to slide more easily within a woven cover to reduce stress and greatly reduce damage to the exterior of the elastic tube. Many failure modes exist for the inner elastic tube, but there are two main failure modes that will be dealt with here. First, an inner elastic tube can chafe against the interior wall of a woven reinforcement cover (outer cover) which will eventually cause it to rupture. Second, an inner elastic tube can experience localized stretching that is beyond its elastic limit and which thereby can cause the inner tube to fail. The use of lubricants greatly reduces chafing of the outer surface of the inner elastic tube, and also greatly reduces the friction forces on the inner elastic tube. Providing periodic bonding or gripping point along the length of the stretch hose can also reduce both chafing and friction forces on the inner elastic tubes.

Many different retractable hose configurations can be used with a variety of different lubricants, including, but not limited to, providing both soft (friction) and hard (bonded) attachment points for the elastic tube to maintain its position with respect to the reinforcement cover. The soft and hard attachment points on the elastic tube help hold the elastic tube in place with respect to the outer cover. These attachment points reduce the amount of sliding of the inner tube within the reinforcement cover and thus reduce wear and stress on the inner elastic tube. The use of both lubricants and attachment points (attachment rings, attachment dots, etc.) greatly reduces the amount of sliding of the inner elastic tube, reduces the maximum stresses on the elastic tube, and greatly reduces wear and chafing on the exterior of the elastic tube.

One problem with existing designs is that an inner elastic tube can get out of position within its reinforcement cover and be broken because of binding. The problem occurs when prior art inner elastic hose 24 (inner elastic tube) binds against reinforcement outer cover 26 and is stretched excessively along one section of the inner elastic tube. This occurs because pressure within the inner elastic tube can cause the elastic tube to expand against the inside of the reinforcement cover, and because of unevenness in the surface of reinforcement cover 26, the inner tube 24 can become locked in place at several places by friction. Then as the reinforcement cover extends (unfolds longitudinally), sections of the inner elastic tube can be held in place against two points within the cover by friction. If too much reinforcement cover material exists between these two friction points the inner elastic tube can be stretched beyond its limit in that section and burst. This problem can solved by using a lubricant (i.e. 37 and 47) between inner tube 24 and outer cover 26. This lubricant reduces the ability to bind inner elastic tube 24 against the outer cover 26 and thus reduces friction forces and allows inner tube 24 to slide smoothly within cover 26. Along with the use of a lubricant, the elastic tube can also comprise periodic holding points on the inner elastic tube to help hold the inner tube in the proper position within the reinforcement cover 26 (outer cover 26 evenly folded along the length of the inner elastic tube when retracted). Friction contact points can be achieved by choosing an inner elastic tube (convoluted, corrugated, bumps, etc.) that makes contact with the inside of the reinforcement cover periodically even when no relative pressure is applied to the inside of the inner elastic tube (inner hose), making the diameter large enough that the inner tube is always in contact with the exterior reinforcement cover. In this way, the inner elastic tube is prevented and/or hindered from slipping excessively out of position with respect to the reinforcement cover, which reduces the chance that one portion of the inner elastic tube will stretch significantly more than another portion. Thus, friction and/or bonding points between the elastic tube and the reinforcement cover help prevent damage to the inner elastic tube.

A lubricated interface between the inner elastic tube and the outer reinforcement cover can be combined with one or more of wear resistant improvements to the elastic tube design to solve many wear related problems now associated with prior art retractable hose designs. The improvements disclosed here provide an improved user experience with the hose, by providing smoother operation, preventing destructive wear, preventing breakage of the inner elastic tube, reducing stresses on the elastic tube.

OBJECTIVES AND ADVANTAGES

Accordingly, several objects and advantages which can be achieved using various aspects of the disclosed technology include:

Protecting Inner Elastic Tube a) To provide an elastically retractable pressure hose comprising a reinforcement cover and an inner elastic hose or tube, with a solid lubricant applied to the interior of the outer reinforcement cover and/or to the outer surface of the inner elastic hose or tube.

b) To provide an elastically retractable pressure hose comprising a reinforcement cover and an inner elastic hose (inner elastic tube), with a solid lubricant applied to the interior of the outer reinforcement cover and/or to the outer surface of the inner elastic tube. Wherein the solid lubricant is a paraffin wax, Teflon coating, and/or other solid polymer coating.

c) To provide an elastically retractable pressure hose comprising a reinforcement cover and an inner elastic tube, with a liquid lubricant applied to the interior of the outer reinforcement cover and/or to the outer surface of the inner elastic tube.

d) To provide an elastically retractable pressure hose comprising a reinforcement cover and an inner elastic tube, with a liquid lubricant applied to the interior of the outer reinforcement cover and/or to the outer surface of the inner elastic tube. Wherein the liquid lubricant is a natural oil, synthetic oil, gel, or other friction reducing liquid.

e) To provide an elastically retractable pressure hose comprising a reinforcement cover and an inner elastic tube, wherein the inner elastic tube defines a plurality of friction points that continuously contact the inside surface of the exterior reinforcement cover to stabilize the inner elastic tube within the reinforcement cover and minimize localized over-stretching and breakage of the inner elastic tube. Wherein a lubricant is applied to the interior surface of the outer reinforcement cover and/or to the exterior surface of the inner elastic tube (inner elastic hose) to reduce friction between the two surfaces.

f) To provide an elastically retractable pressure hose comprising a reinforcement cover and an inner elastic tube with a plurality of protrusions on the inner elastic tube (ring shaped protrusions, bumps, etc.) for stabilizing the inner elastic tube within the reinforcement cover to prevent localized over-stretching and breakage of the inner elastic tube. Wherein a lubricant is applied to the interior surface of the outer reinforcement cover and/or to the exterior surface of the inner elastic tube to reduce friction between the two surfaces.

g) To provide an elastically retractable pressure hose comprising a reinforcement cover and an inner elastic tube, wherein the inner elastic tube defines a ridged nature (e.g. convoluted, corrugated, etc.), wherein the ridges frictionally interact with the interior wall of the outer cover and/or are bonded to the interior wall of the outer cover, to stabilize the inner elastic tube within the reinforcement cover to prevent localized over-stretching and breakage of the inner elastic tube. Wherein a lubricant is applied to the interior surface of the outer reinforcement cover and/or to the exterior surface of the inner elastic tube.

h) To provide an elastically retractable pressure hose comprising a reinforcement cover and an inner elastic tube, wherein a plurality of ring shaped bonds between the reinforcement cover and the inner elastic tube are used to stabilize the inner elastic tube within the reinforcement cover to prevent localized over-stretching and breakage of the inner elastic tube. Wherein a lubricant is applied to the interior surface of the outer reinforcement cover and/or to the exterior surface of the inner elastic tube to reduce friction.

i) To provide an elastically retractable pressure hose comprising a reinforcement cover and an inner elastic tube, wherein a plurality of point bonds (dot and/or short line shaped bonds) between the reinforcement cover and the inner elastic tube are used to stabilize the inner elastic tube within the reinforcement cover to prevent localized over-stretching and breakage of the inner elastic tube. Wherein a lubricant is applied to the interior surface of the outer reinforcement cover and/or to the exterior surface of the inner elastic tube.

j) To provide an elastically retractable pressure hose comprising an outer reinforcement cover and an inner elastic tube, wherein the inner elastic tube defines a bonding ridge (e.g. convoluted ridge, parallel rings, short ridge sections, etc.) protruding from its exterior surface, wherein the bonding ridge can frictionally interact with the interior wall of the outer cover to stabilize the inner elastic tube within the reinforcement cover and prevent localized over-stretching and breakage of the inner elastic tube. Wherein a lubricant is applied to the interior surface of the outer reinforcement cover and/or to the exterior surface of the inner elastic tube to reduce friction between the two surfaces.

Bonded Elastic Tube k) To provide an elastically retractable pressure hose comprising a tube shaped outer reinforcement cover and an inner elastic tube (inner elastic hose), where the inner elastic tube provides a retracting bias to retract the retractable pressure hose, where the inner elastic tube is bonded to the outer reinforcement cover at a plurality of separate areas to control the longitudinal collapse and folding of the outer reinforcement cover when the linearly retractable pressure hose retracts. Wherein a lubricant is applied between the plurality of separate areas to the interior surface of the outer reinforcement cover and/or to the exterior surface of the inner elastic tube to reduce friction between the two surfaces.

l) To provide an elastically retractable pressure hose comprising a tube shaped outer reinforcement cover and an inner elastic tube, where the inner elastic tube provides a retracting bias to retract the retractable hose, wherein the inner elastic tube is bonded periodically to the outer reinforcement cover with a plurality of annular ring shaped bonds for longitudinal controlling the collapse and folding of the outer reinforcement cover when the linearly retractable pressure hose retracts. Wherein a lubricant is applied between the plurality of annular ring shaped bonds to the interior surface of the outer reinforcement cover and/or to the exterior surface of the inner elastic tube to reduce friction between the two surfaces.

m) To provide an elastically retractable pressure hose comprising an outer reinforcement cover encompassing an inner elastic tube, where the inner elastic tube provides a retracting bias to retract the retractable hose, wherein the inner elastic tube is bonded to the inside of the outer reinforcement cover with a plurality of small bonding spots or dots across its surface to control the longitudinal collapse and folding of the outer reinforcement cover when the linearly retractable pressure hose retracts and extends. Wherein a lubricant is applied between the plurality of small bonding spots or dots to the interior surface of the outer reinforcement cover and/or to the exterior surface of the inner elastic tube to reduce friction between the two surfaces.

n) To provide an elastically retractable pressure hose comprising an outer reinforcement cover and an inner elastic tube, where the inner elastic tube is a substantially cylindrical tube and provides a retracting bias for retracting the retractable hose, wherein the inner elastic tube is bonded periodically to the inside of the outer reinforcement cover to control the longitudinal collapse and folding of the outer reinforcement cover when the linearly retractable pressure hose retracts. Wherein a lubricant is applied between the periodic bonds to the interior surface of the outer reinforcement cover and/or to the outer surface of the inner elastic tube to reduce friction between the two surfaces.

o) To provide an elastically retractable pressure hose comprising an outer reinforcement cover and an inner elastic tube, where the inner elastic tube is a substantially cylindrical tube and provides a retracting bias for retracting the retractable hose, wherein the inner elastic tube is bonded to the inside of the outer reinforcement cover at a plurality of locations to control the longitudinal collapse and folding of the outer reinforcement cover when the linearly retractable pressure hose retracts and extends. Wherein a lubricant is applied to the interior surface of the outer reinforcement cover and/or to the outer surface of the inner elastic tube to reduce sliding friction between the two surfaces.

p) To provide an elastically retractable pressure hose comprising an outer reinforcement cover and an inner elastic tube, where the inner elastic tube has a corrugated shape and provides a retracting bias for retracting the retractable hose, wherein the inner elastic tube is bonded periodically to the inside of the outer reinforcement cover to control the longitudinal collapse and folding of the outer reinforcement cover when the linearly retractable pressure hose retracts and extends. Wherein a lubricant is applied between the periodic bonds to the interior surface of the outer reinforcement cover and/or to the outer surface of the inner elastic tube to reduce sliding friction between the two surfaces.

q) To provide an elastically retractable pressure hose comprising an outer reinforcement cover and an inner elastic tube, where the inner elastic tube has a convoluted shape and provides a retracting bias for retracting the retractable hose, wherein the inner elastic tube is bonded at its outer ridge with bond rings to the inside of the outer reinforcement cover to control the longitudinal collapse and folding of the outer reinforcement cover when the linearly retractable pressure hose retracts and extends. Wherein a lubricant is applied between the bond rings to the interior surface of the outer reinforcement cover and/or to the outer surface of the inner elastic tube to reduce sliding friction between the two surfaces.

r) To provide an elastically retractable pressure hose comprising an outer reinforcement cover and an inner elastic tube, where the inner elastic tube has a corrugated shape and provides a retracting bias for retracting the retractable hose, wherein the inner elastic tube has a natural outside diameter at its ridges that is larger than the natural diameter of the interior of the outer cover. Wherein the ridges of the inner elastic tube provide periodical frictional contact with the inside of the outer reinforcement cover to control the longitudinal collapse and folding of the outer reinforcement cover when the linearly retractable pressure hose retracts. Wherein a lubricant is applied to the interior surface of the outer reinforcement cover and/or to the exterior surface of the inner elastic tube to reduce sliding friction between the two surfaces.

s) To provide an elastically retractable pressure hose comprising an outer reinforcement cover and an inner elastic tube, where the inner elastic tube has a convoluted shape and provides a retracting bias for retracting the retractable hose. Wherein the inner elastic tube has a natural outside diameter at its ridges that is within ten percent of the natural diameter of the interior of the outer cover. Wherein the ridges of the inner elastic tube provide periodical frictional contact with the inside of the outer reinforcement cover to control the longitudinal collapse and folding of the outer reinforcement cover when the linearly retractable pressure hose retracts. Wherein a lubricant is applied to the interior surface of the outer reinforcement cover and/or to the exterior surface of the inner elastic tube to reduce sliding friction between the two surfaces.

t) To provide an elastically retractable pressure hose comprising an outer reinforcement cover and an inner elastic tube, where the inner elastic tube has a ridged shape (e.g. corrugated, convoluted, bumps, etc.) and provides a retracting bias for retracting the retractable hose. Wherein the inner elastic tube has a natural outside diameter at its ridges that is substantially the same as the natural diameter of the interior surface of the outer cover. Wherein the ridges of the inner elastic tube provide periodical frictional contact with the inside of the outer reinforcement cover to control the longitudinal collapse and folding of the outer reinforcement cover when the linearly retractable pressure hose retracts. Wherein a lubricant is applied to the interior surface of the outer reinforcement cover and/or to the outer surface of the inner elastic tube to reduce sliding friction between the two surfaces.

u) To provide an elastically retractable pressure hose comprising an outer reinforcement cover and an inner elastic tube, where the inner elastic tube has a ridged shape (e.g. corrugated, convoluted, bumps, etc.) and provides a retracting bias for retracting the retractable hose. Wherein the inner elastic tube has a natural outside diameter at its ridges that is smaller than the natural diameter of the interior surface of the outer cover. Wherein the ridges of the inner elastic tube provide periodical frictional contact with the inside of the outer reinforcement cover when pressure is applied to the interior of the inner elastic tube. This helps control the longitudinal collapse and folding of the outer reinforcement cover when the linearly retractable pressure hose retracts. Wherein a lubricant is applied to the interior surface of the outer reinforcement cover and/or to the exterior surface of the inner elastic tube to reduce sliding friction between the two surfaces.

v) To provide an elastically retractable pressure hose comprising an outer reinforcement cover and an inner elastic tube, where the inner elastic tube has a ridged shape (e.g. corrugated, convoluted, bumps, etc.) and provides a retracting bias for retracting the retractable hose. Wherein the inner elastic tube is bonded at its ridges to the interior surface of the outer cover. Wherein the bonding points provide periodically stabilized contact with the inside of the outer reinforcement cover to control the longitudinal collapse and folding of the outer reinforcement cover around the inner elastic tube when the linearly retractable pressure hose retracts. Wherein a lubricant is applied to the interior surface of the outer reinforcement cover and/or to the exterior surface of the inner elastic tube to reduce sliding friction between the two surfaces.

w) To provide an elastically retractable pressure hose comprising an outer reinforcement cover and an inner elastic tube, wherein the inner elastic tube defines a bonding zone (e.g. convoluted or helical ridge, parallel rings, short ridge sections, dots or patches, etc.) protruding from its exterior surface, wherein the inner elastic tube is bonded at the outer edge pf its ridge(s) to the interior surface of the outer cover. Wherein the bonding points provide periodically stabilized contact with the inside of the outer reinforcement cover to control the longitudinal collapse and folding of the outer reinforcement cover around the inner elastic tube when the linearly retractable pressure hose retracts. Wherein a lubricant is applied to the interior surface of the outer reinforcement cover and/or to the exterior surface of the inner elastic tube to reduce sliding friction between the two surfaces.

x) The elastic retractable pressure hose in items e) through w) wherein the lubricant is a solid lubricant such as a paraffin wax, Teflon coating, and/or other solid polymer coatings.

y) The elastic retractable pressure hose in items e) through w) wherein the lubricant is a liquid lubricant such as a natural oil, synthetic oil, gel, or other oily liquid.

z) The elastic retractable pressure hose in items e) through w) wherein the lubricant reduces chafing and wear on the exterior surface of the inner elastic tube.

BRIEF DESCRIPTION OF THE DRAWINGS

FIG. 1A Prior Art elastic retractable stretch hose input end (faucet connector end).

FIG. 1B Prior Art elastic retractable stretch hose output end (nozzle connector end).

DETAILED DESCRIPTION

Figure 2A:
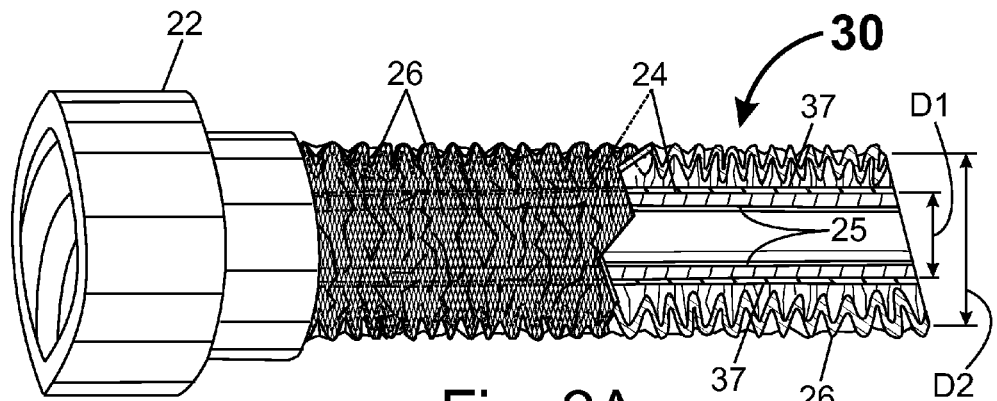
FIG. 2A Elastic retractable stretch hose with lubricant coating on inner elastic tube (retracted).

In FIG. 1A-B, we see a perspective section view of a prior art retractable stretch hose 20 (retractable pressure hose) similar to the "X-hose" produced by National Express. FIG. 1A shows hose 20 in its relaxed state (depressurized), while FIG. 1B shows hose 20 in its pressurized operational state. Retractable hose 20 comprises an inner elastic hose 24 (inner elastic tube), a woven reinforcement outer cover 26, an inlet connector 22, and an outlet connector 28. Outer cover 26 can comprise a tube-shaped woven reinforcement that is composed of high-strength fibers, and designed to support the pressure conducted into inner elastic tube 24. Outlet connector 28 comprises a flow restriction ridge 29 to generate pressure within interior channel 25 of elastic tube 24. Inner elastic tube 24 extends through reinforcement outer cover 26 where the natural length of inner elastic tube 24 is about one-third the natural length of woven outer cover 26. Inner elastic tube 24 has an outside diameter D1, and outer reinforcement cover 26 has an inside diameter D2. Outside diameter D1 of elastic tube 24 is approximately one-half the inside diameter D2 of outer cover 26. This difference in diameter is to allow significant extension of the retractable hose 20 before the elastic tube 24 is forced up against the interior surface of outer cover 26. This helps protect the inner elastic tube from being over extended by the expanding outer cover. Both inner elastic tube 24 and outer cover 26 are cylindrical in shape and when elastic tube 24 is pressurized from within with a liquid and/or a gas, the elastic tube is forced to expand both radially and longitudinally against outer cover 26. This pressure extends outer cover 26 to its fully extended length as seen in FIG. 1B. A water inlet connector 22 is attached to one end of both the inner elastic tube 24 and outer cover 26, and outlet connector 28 is connected to the other end of inner elastic tube 24 and outer cover 26. Inner elastic tube 24 and outer cover 26 are only attached (secured) at the connectors and are free to slide longitudinally with respect to one another between connectors 22 and 28. Inlet connector 22 is designed to attach to a standard residential water faucet. Outlet connector 28 is designed to connect to a spray nozzle or other garden hose nozzle which acts as a flow restriction device to increase pressure within the hose to expand it. Outlet connector 28 also includes its own flow restriction ridge 29 to increase internal pressure that helps expand elastic tube 24. When water pressure is released, the pressure inside retractable hose 20 can return to atmospheric pressure and the elastic nature of elastic tube 24 pulls hose 20 back to its retracted state seen in FIG. 1A.

In FIGS. 2A, and 2C through 4D, we see several examples of retractable hoses. Each of these examples show their inner elastic tubes 24, 54, 64, 74, 84, 94, and 104 in its substantially relaxed state or natural state (no internal pressure), while only FIGS. 2A, 2C, and 4A-D show outer cover 26 in a depressurized or retracted state. FIGS. 3A-C show cover 26 fully inflated to allow the reader to more easily see the relationship between the relaxed diameter of inner elastic tubes 24, 54, 64, 74, 84, 94, and 104 and the expanded diameter of outer cover 26. In FIG. 2B retractable hose 30 is shown in its pressurized and fully extended state for both elastic tube 24 and outer cover 26. Each of these examples uses the same outer cover 26 for comparison purposes, and comprises a tube shaped reinforced cover with an inside diameter D2 when fully expanded, and an outside diameter D3 when fully expanded. In alternate examples outer cover 26 can be woven with variations in its effective diameter (see outer cover 26a at wear ring 72) to facilitate longitudinal retraction or collapse of the outer cover and also help lock the position of its inner elastic tube in place to prevent damage to the elastic tube.

Figure 2B:
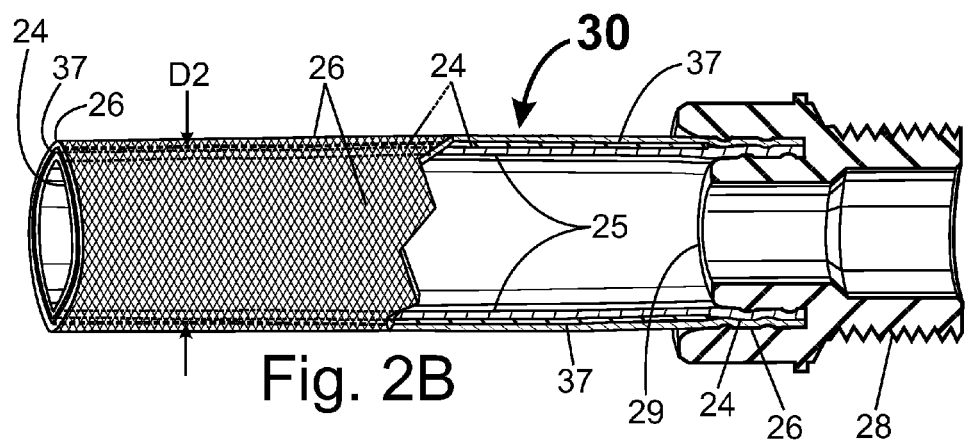
FIG. 2B Elastic retractable stretch hose with lubricant coating on inner elastic tube (expanded).
Figure 2C:
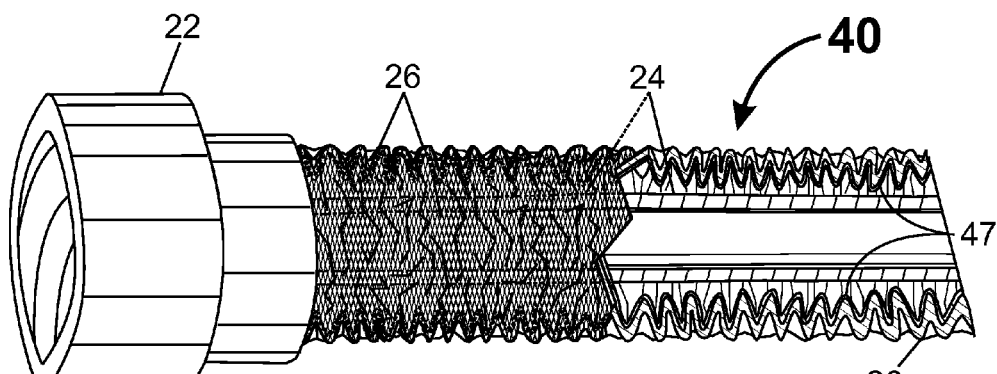
FIG. 2C Elastic retractable stretch hose with lubricant coating on interior of reinforcement cover.

In FIGS. 2A-B, elastic retractable stretch hose 30 (retractable pressure hose) comprises an inlet connector 22, an inner elastic tube 24, an outer reinforcement cover 26, an outlet connector 28, and a lubricant 37 applied to the exterior of elastic tube 24. FIG. 2A shows hose 30 in its relaxed state, while FIG. 2B shows hose 30 in its pressurized state. FIG. 2A shows the inlet end of hose 30, while FIG. 2B shows the outlet end of hose 30. Inlet connector 22 is securely attached to elastic tube 24 and outer cover 26, and designed to connect to a pressurized fluid or gas source. Inlet connector 22 is designed to direct these pressurized fluids or gasses into the interior of inner elastic tube 24. Outlet connector 28 is connected to inner elastic tube 24 and outer cover 26 on their opposite end of hose 30, and designed to connect to various nozzles or applicator attachments. Outlet connector 28 is designed to direct fluids or gasses within elastic tube 24 to flow past flow restriction ridge 29 and out the end of hose 30 (see FIG. 2B). Flow restriction ridge 29 helps build pressure within elastic tube 24 to extend retractable hose 30 for use. Outer cover 26 can be a woven or braided tube made from high strength fibers to support the pressure introduced within inlet connector 22. Lubricant 37 is coated on the exterior of elastic tube 24 before insertion into outer cover 26 and attachment of connectors 22 or 28. Lubricant 37 is designed to reduce friction and wear on elastic tube 24 as the elastic tube slides within cover 26 during extension and retraction of hose 30. Care should be taken during assembly so that lubricant 37 is not scraped to one end of retractable hose 30, as there will preferably be an even coating of lubricant 37 along the full length of hose 30. In FIG. 2C, we will see that an even coating of lubricant can also be obtained by coating the interior of outer cover 26 along its entire length. Because the outer cover 26 will preferably have a porous nature, using this approach may reduce the likelihood of the lubricant being scraped off or shifted within retractable hose 30 during manufacturing. Both methods of applying the lubricant tends to trap the lubricant between the elastic hose and the outer cover. The fibrous nature of outer cover 26 tends to keep the lubricant from being dispersed into the environment.

In FIG. 2C, we see elastic retractable stretch hose 40 (retractable pressure hose) which has substantially the same hose structure as retractable hose 30, but lubricant 47 is applied to the interior of outer cover 26 instead of on the exterior of elastic tube 24. Lubricant 47 can be the same as lubricant 37, but simply coated on outer cover 26 instead of elastic tube 24. In embodiments where outer cover 26 has a fabric like nature, this could beneficially facilitate the soaking up of liquid lubricants by the outer cover 26, while also holding solid lubricants (powders, thick greases, paraffin, thick gels, etc.) in its fibers. Because outer cover 26 will preferably be porous (absorbent) and longer than elastic tube 24, it is easier to get an even coating of lubricant 47 along the entire length of retractable hose 40 than in hose 30. The lubricants disclosed herein can also be coated on both the inner elastic tube 24 and outer reinforcement cover 26 if desired, but coating one surface is sufficient for most hose designs. Also note that if both elastic tube 24 and outer cover 26 are coated, they can be coated with the same or different lubricants as needed. This allows the designer to tailor the lubricants to the specific materials that elastic tube 24 and outer cover 26 are made of. Lubricant coatings were tested on the outer cover of several retractable hose designs (stretch hose designs), and it was found that, for some solid lubricants like paraffin wax, the lubricant's lubricating properties can actually improve over time.

In FIGS. 2A-C, elastic tubes 24 are shown being used with lubricants 37 and 47 to greatly increase the durability and life expectancy of their respective retractable hoses. However, these prior art inner elastic tubes 24 place a limit on the extensibility of retractable hoses 20, 30, and 40 to approximately 3× extension ratios (extends to three times their collapsed length (retracted length)). This limit is the result of the elastic limit of the natural latex rubber used to make elastic tube 24. Natural Latex rubber has a maximum elongation of approximately 750% (7.5×). If elastic tube 24 (sometimes called an elastic hose) has an outside diameter D1 that is half the inside diameter D2 of outer cover 26 when expanded (see FIG. 3A), then half of the latex's elastic elongation is used up expanding radially from outside diameter D1 of elastic tube 24 to inside diameter D2 of outer cover 26, then approximately 375% elongation remains for elastic tube 24 to stretch in the longitudinally direction. To maintain a small safety margin, the hoses are not stretched longitudinally more than 300% (200% radial times 300% longitudinal=600% total elongation). However, if the diameter of the inner elastic tube were increased to match the inside diameter of outer cover 26, then this larger diameter elastic tube would not need to stretch radially as much when pressurized, and significantly more of its 750% elongation can be used to extend the retractable hose longitudinally. If the inner elastic tube is made with a natural diameter greater than the inside diameter of the outer cover, the elastic tube can actually contract radially when stretched, allowing even greater longitudinal extension ratios.

Tests with these large diameter inner elastic tubes and elastic tubes with about the same diameter as the outer cover showed that 6× extension hoses (extended length six times their collapsed length) were easily achievable. (Note that bungee hose 130, see FIGS. 5A-B has a braided outer cover 136 that shrinks in diameter when stretched longitudinally so that even smaller diameter elastic tubes can extend to five or six times their retraced length). With paraffin lubricant on the interior of test outer cover (see lubricant 47 on retractable hoses 50 and 60), the large diameter inner elastic tubes achieved approximately 6× extension ratios with the same or better durability (extension/retraction cycles) as prior art 3× retractable hoses, while using only one-third the wall thickness of natural latex rubber as used in prior art 3× retractable hoses. The use of lubricants greatly extended the life of these 6× hoses. Extension/Retraction ratios greater than 6× were not tested because the outer cover was starting to show difficulty folding all the cover's material into such a short collapsed length, but the larger diameter inner elastic tubes appeared capable of larger extension ratios beyond six-to-one. It was also noticed that the very large diameter elastic tubes tested folded radially (lengthwise fold) to allow the elastic tube to collapse radially inside the hose cover and allow the hose cover to be retracted (longitudinally collapsed). That is, the collapsing of the outer cover tended to push and fold the larger diameter inner elastic tubes inward to make room for the folds of the outer reinforcement cover.

Tests conducted with inner elastic tubes that had a larger diameter than the interior diameter of the outer cover showed no difficulties in retracting and folding the outer cover to its collapsed length at 6× extension ratios (longitudinal expansion ratio). In all tests with inner elastic tubes larger than the outer cover diameter, the hoses extended and retracted (collapsed) with an extension ratio of six-to-one and appeared to have very little problem retracting even though the inner elastic tubes needed to compress radially to fully retract.

In FIGS. 3A through 4D, we see various retractable hoses with inner elastic tubes having diameters that are approximately equal to or slightly less than the inside diameter of covers 26 and 26a Inner elastic tubes 54, 64, 94, and 104 are only shown with a diameter that is equal or slightly less than the inside diameter of cover 26 and 26a, because of the difficulty in actually drawing an inner elastic tube that has a diameter larger than the inside diameter D2 of cover 26 (which, as described above, can cause the elastic tube to fold radially when the hose in its retracted state). However, the reader should understand that inner elastic tubes 54, 64, 94, and 104 can have a natural outside diameter greater than inside diameter D2 or even outside diameter D3 of their respective outer covers 26. Having an inner elastic tube with an outside diameter which is greater than sixty percent (60%), seventy percent (70%), eighty percent (80%), ninety percent (90%), ninety-five percent (95%), one hundred percent (100%), and/or one hundred five percent (105%) of the inside diameter D2 and/or outside diameter D3 of outer cover 26 can allow a hose to have greater extensibility than would be achievable using an inner elastic tube (such as seen in the prior art) having an outside diameter of approximately 50% of the inside diameter D2 of the outer cover 26. It is the relationship between the diameters of the inner elastic tube and its outer cover that mostly determines the extension ratio of the retractable hose. The larger the inner elastic tube's diameter is compared to the outer cover's diameter, the greater the extension ratio can be (up to a limit determined by the elasticity of the inner elastic tube and the extended length of the outer cover).

Figure 3A:
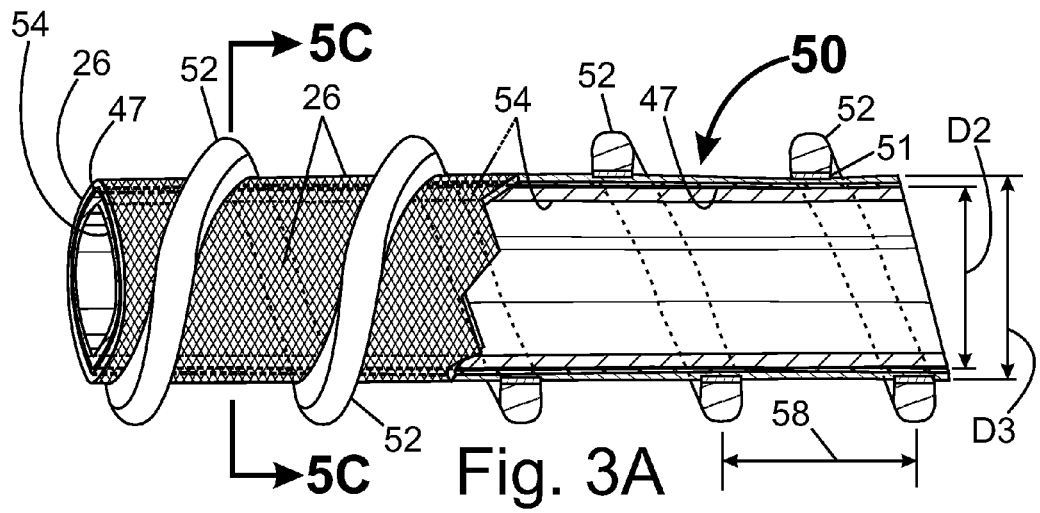
FIG. 3A Elastic retractable stretch hose with lubricant coating on interior of reinforcement cover and helical wear strip on its exterior.
Figure 3B:
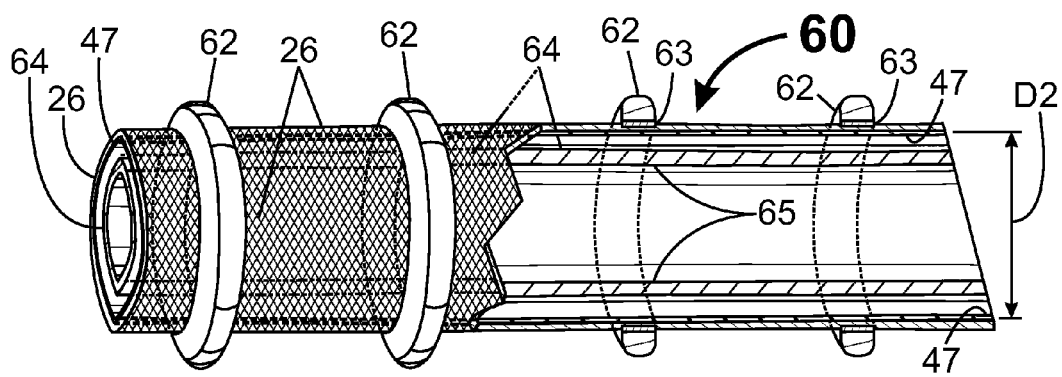
FIG. 3B Elastic retractable stretch hose with lubricant coating on interior of reinforcement cover and a plurality of annular wear rings on its exterior.

In FIGS. 3A-B, we see two different ways of providing wear protection for outer cover 26. During normal use, hoses like the retractable pressure hoses shown herein are susceptible to damage to the woven outer cover 26. Dragging cover 26 over concrete or other abrasive surfaces can quickly wear and damage its integrity. To improve the durability of the outer cover, various wear resistant structures can be bonded to the outside of hose cover 26. These wear resistant structures can comprise wear resistant polymers, metals, composites, or other wear resistant materials. These wear resistant structures can be bonded to outer cover 26 by various known bonding methods, such as by being, mechanically bonded, thermally bonded, adhesively bonded, being connected with bonded interface material, or other bonding methods. The thickness of the wear resistant structures can be increased or decreased depending on the greater or lesser respective wear resistance needed. The wear resistant structure(s) will preferably allow outer cover 26 to retract (see example in FIG. 1A) where outer cover 26 is compressed longitudinally into a folded or crumpled structure that is much shorter than its fully extended length. In each of the drawings in FIGS. 3A-B, outer cover 26 is shown in its expanded state and inner elastic tubes 54 and 64 respectively are shown in their depressurized or unextended states. This combination, where cover 26 is expanded and inner elastic tubes 54 and 64 are relaxed is generally not seen at the same time in this type of hose, but showing these two states in a single drawing allows the reader to see the two structures in their natural state at the same time. Retractable hoses such as described herein can be implemented to feature connections between end connectors (e.g., end connectors 22 and 28 as seen in FIGS. 1A and 1B, respectively, or similar end connectors) and the hoses' inner elastic tubes and outer covers. Further, retractable hoses such as described herein can have their outer covers coated with a water repellant coating, or layer, to keep water and dirt from entering outer cover 26. Such water repellant coatings might be a spray on hydrophobic material like Scotch Guard or other hydrophobic spray on material and may also serve as a lubricant for the interface between cover 26 and its respective inner elastic tube. For example, a water repellant coating that can also act as a lubricant might be a dip applied hydrophobic material (i.e. paraffin) that can be applied to the fibers before weaving or to the entire woven cover after it is woven. Finally, a water repellant layer might be used that is only applied to the outer surface of outer cover 26 to form a thin water proof and/or water repellant layer or coating. Such a water repellant layer can comprise various polymers that can be extruded, coated, sprayed, or otherwise layered onto the exterior surface of the outer cover for the hose.

In FIG. 3A, we see a perspective section view of elastic retractable stretch hose 50 (retractable pressure hose), comprising an inner elastic tube 54, an outer cover 26 with a lubricant layer 47 on its interior surface, a spiral wear strip 52 and a bonding material layer 51. Inner elastic tube 54 has the same outside diameter as the inside diameter D2 of outer cover 26. Thus, elastic tube 54 is shown in its relaxed state against lubricant layer 47, which is normally very thin, on the inside of outer cover 26. Note that in FIG. 3A, outer cover 26 is shown in its expanded position, while inner elastic tube 54 is shown in its collapsed position (natural or neutral state). This design can also use inner elastic tubes larger in diameter than inner diameter D2 of outer cover 26 (see larger diameter elastic tube 54a folded lengthwise inside cover 26 in FIG. 5C), and can produce retractable hoses that allow greater extension ratios than six-to-one. Elastic tube 54 is installed through the interior of outer cover 26, and connectors 22 and 28, seen in FIGS. 1A-B, respectively, can be attached at opposite ends of elastic tube 54 and outer cover 26 to form a retractable hose similar to hose 30. In FIG. 3A, wear strip 52 is shown bonded to outer cover 26 by bonding layer 51. It should be understood that, even in implementations comprising spiral wear strips 52 (or similar wear resistance structures) bonding layer 51 is optional, and the wear resistance structures (e.g., wear strip 52) can be chemically, thermally or mechanically (physically melted around the cover's fibers) bonded to the outer cover 26. In cases, where strip 52 is made of a material that cannot be directly bonded, one or more interface bonding layers 51 can be used. Bonding layer 51 can comprise an adhesive and/or polymer that will bond to both strip 52 and cover 26. This is especially useful if strip 52 and cover 26 are made of very different materials. Bonding layer 51 can also be implemented as a coating(s) on either cover 26 and/or strip 52 that allows cover 26 and strip 52 to be bonded together. Bonding layer 51 can also be made of a flexible material to provide a resilient interface between the foldable outer cover 26 and the harder wear-resistant wear strip 52. Helical implementations of wear strip 52 can be broken up into multiple coil sections as desired. Wear strip 52 should allow the hose to retract to its fully collapsed position. Thus, any wear resistant strip, ring, and/or buttons will preferably allow the outer cover 26 to fold up longitudinally and retract longitudinally similar to the way cover 26 is folded and collapsed in FIG. 1A. In alternative designs, two or more coils of wear strips can be used adjacent each other so that the angle at which they spiral around outer cover 26 can be increased while still keeping the spacing between coils the same as coil pitch 58 for wear strip 52.

In FIG. 3B, we see a perspective section view of elastic retractable stretch hose 60 (retractable pressure hose), comprising an inner elastic tube 64, an outer cover 26 with a layer of lubricant 47 on its interior surface, a plurality of circular wear rings 62, and a bonding material 63. Construction of hose 60 is very similar to hose 50 except instead of a spiral wear strip 52, a plurality of wear rings 62 are bonded periodically along the length of hose 60. Also, inner elastic tube 64 (inner hose) has a larger diameter than prior art inner elastic tube 24, but a smaller diameter than inner elastic tube 54, and thus will tend to bind with outer cover 26 more than elastic tube 24, but less than elastic tube 54. Wear rings 62 are designed to substantially fit around outer cover 26 at its expanded outside diameter D3 (see FIG. 3A). Alternatively, wear rings can be used where their diameter is smaller than the outside diameter D3 of cover 26 so that cover 26 is indented at the location of the wear ring. Cover 26 can be woven with this smaller diameter at these locations so the wear ring fits naturally in the ring-shaped indentation (ring-shaped valley). This ring shaped indentation can provide a narrowed contact surface portion on the interior of cover 26 that can help hold inner elastic tube 64 in position during use and storage. Friction contact can be sufficient to hold inner elastic tube 64 in position with respect to outer cover 26 during use and storage, though periodically bonding of elastic tube 64 to the outer cover 26 provides greater protection for elastic tube 64.

Without bonding, elastic tube 64 can adjust its position with respect to outer cover 26 to relieve differences in strain within the inner elastic tube. Wear rings 62 can stack next to one another as hose 60 retracts to its stowed length (collapsed position). The spacing of rings 62 will depend on the needs of that particular hose. Rings 62 can be held in place by bonding materials 63, which can be the same as bonding material 51 seen in FIG. 3A. Wear rings 62 can be formed in a number of ways. Rings 62 might be injection molded prior to being bonded to cover 26, either as a complete ring or two or more bondable segments. Rings 62 can also be injection molded or extruded directly onto cover 26 to thermally bond rings 62 to cover 26. Other methods can also be used to manufacture and bond wear rings 62 to outer cover 26.

In FIG. 3B, we see a perspective section view of elastic retractable stretch hose 60 (retractable pressure hose), where inner elastic tube 64 defines a diameter slightly smaller than inside diameter D2 of elastic tube 54. This requires elastic tube 64 to expand radially slightly when pressurized to come into three-hundred sixty degree contact with the interior surface of outer cover 26. While pressurized, an interior channel 65 within elastic tube 64 would increase in diameter from its shown size. Retractable hose 60 comprises wear resistant rings 62 to prevent outer cover 26 from being damaged. Wear rings 62 can be bonded to outer cover 26 with bonding material 63 if needed. Bonding material 63 can be any of a number of adhesives or polymers that can bond rings 62 to outer cover 26. Elastic tube 64 can be made of an elastic material that can substantially return to its natural state after being stretched. The use of a thermoset (thermal set) or crystalline elastomer for elastic tube 64 can provide a more stable retracting ability for the hose. Elastic tube 64 has a slightly smaller outside diameter than the interior surface diameter of cover 26 in its relaxed state (natural state). This arrangement allows elastic tube 64 to slide longitudinally within outer cover 26 when not pressurized (depressurized), and thus provides the elastic tube 64 with the property of being self adjusting if outer cover 26 somehow gets improperly positioned.

Figure 3C:
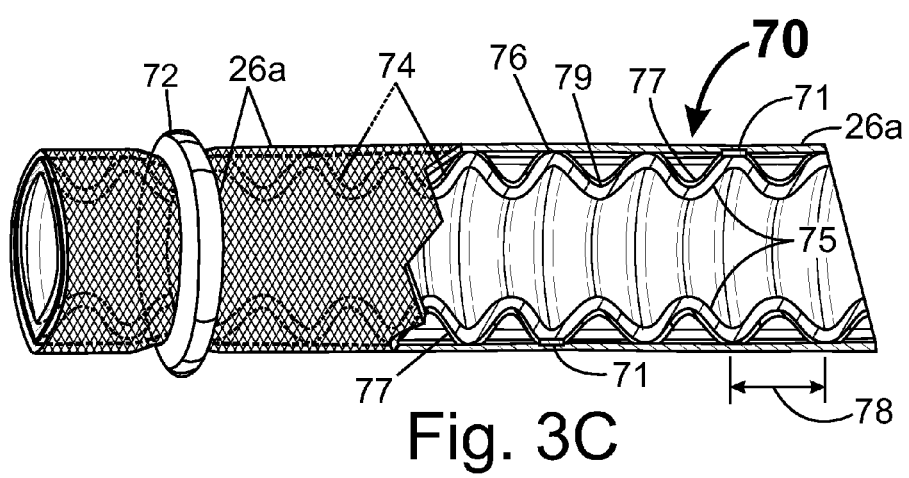
FIG. 3C Elastic retractable stretch hose with lubricant coating on the exterior of a corrugated inner elastic tube in snug contact with reinforcement cover when depressurized and a plurality of wear bumps on its exterior.

In FIG. 3C, we see a perspective section view of elastic retractable stretch hose 70 (retractable pressure hose), comprising an inner elastic tube 74, an outer cover 26a, a lubricant 77, and a wear ring 72 (which could be part of a plurality of optional wear rings). Retractable hose 70, as with other hoses described herein, can be bonded to connector ends 22 and 28, or similar ends, to provide a usable hose. Other styles of connector ends similar to connectors 22 and 28 can be connected to allow retractable hoses such as disclosed herein to be used as compressed air hoses, fire hoses, industrial hoses, commercial hoses, medical hoses, or other types of hoses. Inner elastic tube 74 defines a plurality of ridges 76, a plurality of annular valleys 79, and an interior fluid channel 75. Inner elastic tube 74 defines a ridge pitch 78, which is the distance between adjacent ridges. Ridge pitch 78 can be selected for the particular needs of a particular retractable hose. Inner elastic tube 74 can be made of an elastic material that can substantially return to its original state after being stretched (e.g. a thermal set elastomer. Inner elastic tube 74 has an outside diameter defined at the crest of ridges 76 in its relaxed state (natural state), that can be greater than the diameter of the interior surface of outer cover 26a, so that, the elastic tube 74 fits snugly against the interior of outer cover 26a. This contact between ridges 76 and outer cover 26a provides periodic points along the retractable hose that tend to hold elastic tube 74 in place during use and also when collapsed. This tends to maintain the length of outer cover material between adjacent ridges of elastic tube 74 and thus controls the amount of stretch (strain) experienced by a particular section of inner elastic tube 74. In alternative designs, ridges 76 can be bonded to outer cover by any of a number of methods, such as, using a flexible adhesive 71 to bond ridges 76 to cover 26a and/or by thermally bonding ridges 76 to cover 26a. Many other bonding methods can be used to bond ridges 76 to cover 26a. Flexible adhesive 71 can also comprise an adhesive that can be activated to bond ridges 76 to cover 26a when desired.

In FIG. 3C, the corrugated nature of inner elastic tube 74 provides another advantage over prior art hoses such as shown in FIGS. 1A-1B, in that, the corrugated shape can allow an elastic tube similar to elastic tube 74 to extend longitudinally about two times its natural length before significant amounts of strain begin to occur in the elastic material that comprises inner elastic tube 74. This allows retractable hose 70 to extend to a much greater length than other prior elastic-biased retractable hoses. Also, the increased natural diameter of inner elastic tube 74 over prior art elastic-biased retractable hoses, means that it needs to stretch less radially when pressurized. The reduction in radial stretching leaves more of the elastic ability of inner elastic tube 74 to be used for longitudinal stretching instead of being wasted on radial stretching. Thus, hose 70 can have significantly larger stretch ratios than prior art hoses, and a five-to-one stretch ratio, or greater, is easily achievable with this design. Prior art elastic-biased retractable hoses such as shown in FIGS. 1A-1B are limited to around three-to-one stretch ratios because of the limits of present day elastic materials and the diameter of their interior hoses.

Figure 4A:
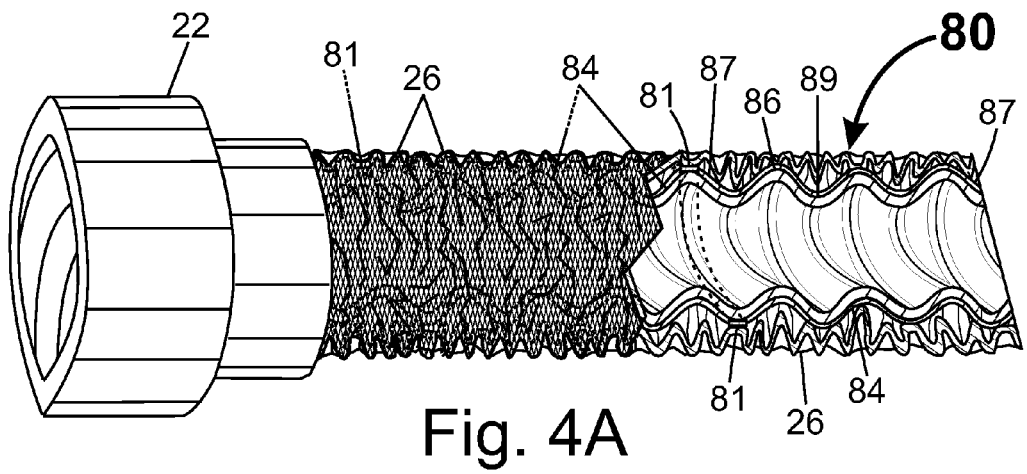
FIG. 4A Elastic retractable stretch hose with lubricant coating on the exterior of a convoluted inner elastic tube with periodic bonding of the inner elastic tube to the outer reinforcement cover.

In FIG. 3C, inner elastic tube 74 can be made the same diameter or slightly smaller in diameter than the interior surface of the outer cover 26a so that as soon as pressure is applied to inner elastic tube 74, ridges 76 are pressed against outer cover 26a, securing them in place. Later as pressure increases, valleys 79 also stretch and contact outer cover 26a. In alternative designs, the diameter of ridges 76 can be made with a natural diameter slightly larger than the natural inside diameter of cover 26a. In FIG. 3C, we see with an outer cover 26a that has an interior surface with a diameter equal to or smaller than the natural diameter of as inner elastic tube ridges 76. This can allow inner elastic tube 74 to be easily secured to the outer cover 26a and provide periodic securing points that lock the inner elastic tube in position with respect to outer cover 26a by either friction or bonding. As shown in FIG. 4A, the inner elastic tube can also have ridges that are smaller in diameter than the interior diameter of the reinforcement cover. In FIG. 3C, retractable hose 70 can also comprise a plurality of wear rings 72 that can be periodically bonded to outer cover 26a using nearly any bonding method, including, but not limited to, thermal bonding, chemical bonding, use of adhesive bonding materials, or other bonding materials.

In FIG. 3C, wear rings 72 are slightly smaller in diameter than wear rings 62 seen in FIG. 3B, and can be used with retractable hose 70 to provide small constrictions in the diameter of outer cover 26a, while at the same time protruding radially to a diameter significantly larger than the outside diameter of cover 26a. This shape can also be woven into outer cover 26a by reducing the diameter of the radial yarn(s) used in those constricted sections. The smaller wear rings 72 can be positioned so they fit within these constricted portions (reduced diameter portions) of outer cover 26a in particular valleys 79 between ridges 76. In FIG. 3C, only one wear ring 72 is shown, representing the potential for having relatively wide spacing between rings. However, wear rings 72 can be placed closer together to provide more wear protection. The other function of small wear rings 72 is to help lock outer cover 26a in place with relationship to ridges 76 on elastic tube 74. In FIG. 3C, inner elastic tube 74 is shown in its relaxed state while outer cover 26a is shown in its stretched out and pressurized shape. The reader should understand that these two positions or states would not be expected to occur together in an actual hose, and are shown here to illustrate for the reader the natural shape of elastic tube 74 and outer cover 26a at the same time. When depressurized, hose 70 can appear as hose 80 does in FIG. 4A. When pressurized with a liquid and/or gas, elastic tube 74 will be pressed radially outward flat against and outer cover 26a and appear similar to extended retractable hose 20 seen in FIG. 1B. When pressure is removed and hose 70 retracts (collapses), outer cover 26a would fold and crumple as elastic tube 74 returns to its relaxed state. When pressurized, both outer cover 26a and elastic tube 74 will extend longitudinally until outer cover 26a is fully expanded. The length of cover 26a material between rings 72 can be chosen for each particular retractable hose. For this example, hose 70 might be designed to expand longitudinally approximately five times its collapsed length.

Figure 4B:
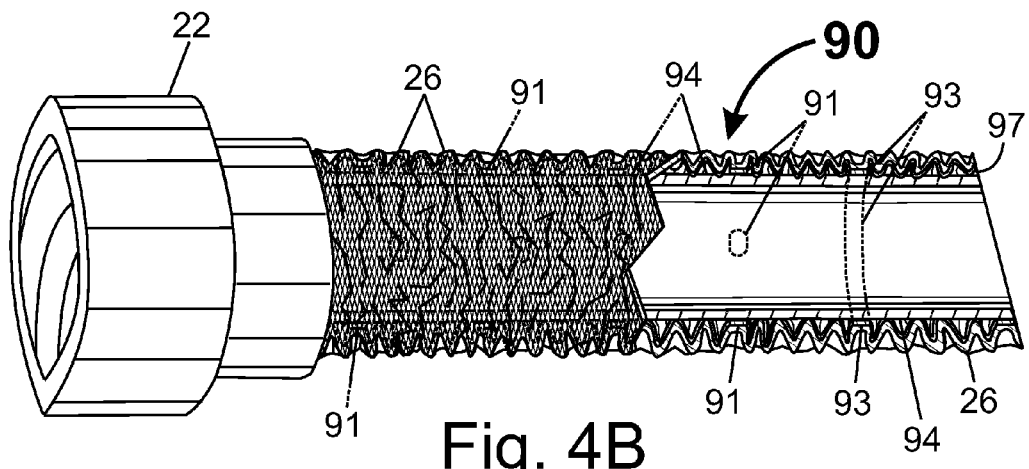
FIG. 4B Elastic retractable stretch hose with a lubricant coating on interior of reinforcement cover with periodic bonding spots 91 and/or bonding rings 93 attaching the exterior of inner elastic tube 94 periodically to the outer reinforcement cover 26.

In FIGS. 4A and 4B, the wear resistant protection structures seen in FIGS. 3A-B are not shown to keep the drawing uncluttered, but similar wear protection can be used with either of these retractable hose examples. Both of the examples of FIGS. 4A and 4B show outer cover 26 and inner elastic tubes 84 and 94 in their collapsed and relaxed position or state. In an actual hose the diameter of inner hoses 84 and 94 can be compressed radially and thus might not have a uniform shape within a compressed cover as seen here. Thus, cover 26 can fold into a much smaller relative volume than shown here, especially if high extension ratios above three times (3×) are used. When pressurized with a liquid and/or gas, both retractable hose examples 80 and 90 would appear similar in structure to pressurized retractable hose 20 seen in FIG. 1B, both on the interior and the exterior. However, in their collapsed, depressurized state, the difference in construction can be seen.

In FIG. 4A, we see a perspective section-view of elastic retractable stretch hose 80 (retractable pressure hose), comprising a convoluted inner elastic tube 84 that is coated with a lubricant 87 on its exterior surface, an outer cover 26, and optional bonding pads or strip 81. Inner elastic tube 84 is convoluted in shape and comprises a single spiral ridge 86 and a single spiral valley 89 that follow each other along the length of the hose. Inner elastic tube 84 can have an outside diameter for ridge 86 which is chosen so that during extending, retracting and folding of outer cover 26, its position tends not to slip out of positions with respect to elastic tube 84. This design helps keep a predetermined amount of folded outer cover 26 between adjacent coil of ridge 86, and helps prevent over stretching of any particular section of elastic tube 84. This stabilizing of the position of outer cover 26, comes partially from inner elastic tube 84 having a significantly larger diameter than prior art elastic tube 24 (inner elastic tube). This larger diameter reduces the radial strain in inner elastic tube 84, which tends to increase its ability to stretch in the longitudinal direction. Further, the convoluted nature of inner elastic tube 84, similar to corrugated inner elastic tube 74, can provide greater elongation before reaching breaking strain compared to straight elastic tubes like inner elastic tube 24.

In FIG. 4A, bonding pads or strip 81 can be used to further lock outer cover 26 in position with respect to convoluted inner elastic tube 84. To insure that outer cover 26 does not slowly work its way out of position, or that the user moves cover 26 out of position while stowed, these bonding systems can be used to bond inner elastic tube 84 to outer cover 26. Bonding pad 81 can comprise a soft flexible adhesive and/or polymer that strongly bonds to both inner elastic tube 84 and outer cover 26. Such a bonding system might comprise a soft flexible layer that allows inner elastic tube 84 to easily stretch when pressurized to reduce strain in the bonded area. Bonding pads 81 might also comprise a low temperature flexible glue that can be melted and bonded to both outer cover 26 and inner elastic tube 84. The thickness of bonding pads 81 can be thicker than shown in FIGS. 4A-B to provide strain relief between inner elastic tube 84 and reinforced outer cover 26. If heat is used as an activator for an adhesive, polymer, and/or glue, the heat applied should be of a low enough temperature and/or for a short enough time duration that neither elastic tube 84 nor outer cover 26 is significantly damaged by the heat. Bonding pads 81 (patch and strip) can also comprise a heat activated adhesive. Alternatively, a multilayer bonding system can be used with this hose design and the other hose designs presented herein. With a two layer bonding system each layer would strongly bond to its respective component of the hose (elastic tube 84 or outer cover 26) and would also bond strongly to each other. This two component bonding method can have one component applied to the interior surface of outer cover 26, and the other component applied to the ridges of inner elastic tube. A two component bonding method could also comprise a preformed spacer that has the appropriate adhesive on each side of the spacer so that the spacer bonds to both the outer cover and the inner elastic tube, and also provides the flexibility needed to stretch with the inner elastic tube. Such a bonding spacer can use the same bonding agent on both sides if such a bonding agent exists that bonds strongly to both inner elastic tube 84 and outer cover 26.

In FIG. 4B, we see a perspective section-view of elastic retractable stretch hose 90 (retractable pressure hose), comprising a cylindrical inner elastic tube 94, an outer cover 26 with a lubricant 97 applied to its interior surface, and an optional bonding pads 91 and/or optional bonding rings 93. In this particular example, Inner elastic tube 94 comprises an elastic cylindrical tube for providing a retracting force to hose 90 and for conveying fluids or gases entering from input connector 22 and flowing to the other end of retractable hose 90 which can have attached a flow restrictor (see flow restricting ridge 29), or flow restrictor connector similar to connector 28. Inner elastic tube 94 can be very similar to inner elastic tube 24 seen in FIG. 2A-C, but has a larger diameter to reduce stresses on elastic tube 94. Inner tube 94 is periodically bonded to outer cover 26 with bonding pads 91 and/or bonding rings 93. The diameter of elastic tube 94 can be larger than the interior diameter of outer cover 26 and its wall thickness can be thinner than prior art elastic tube designs. These improvements can be supported by the fact that lubricant 97 provides a low friction coefficient between inner elastic tube 94 and outer cover 26. The periodic bonding of inner elastic tube 94 to outer cover 26 also greatly reduces the maximum frictional forces that can be created against elastic tube 94, and thus reduces the strain and wear in inner elastic tube 94. Because the binding or frictional forces of elastic tube 94 against cover 26 is much less of a problem with periodic bonding, and the diameter of elastic tube 94 can be increased to further reduce the overall strain within inner elastic tube 94 for the same longitudinal extension ratio. The wall thickness of elastic tube 94 can be thinner because of the lower frictional stresses resulting from both the periodic bonding and the reduced friction from using lubricant 97.

In FIG. 4B, the result of these improvements (lubricant 97 and periodic bonding of cover 26 and elastic tube 94) allows this design to use a significantly thinner walled inner elastic tube 94, which can reduce the retracting force on retractable hose 90 and allow extending and retracting with a more ergonomic water pressure differential. Prior art elastic tubes, such as shown in FIGS. 1A-1B, use relatively thick walled inner elastic tubes because of the large longitudinal stresses they must endure because of the large frictional forces that can be created against outer cover 26 (i.e. outer cover gets longitudinally out of place). The thicker wall of the prior art inner elastic tubes also means a larger internal pressure must be reached before the inner elastic tube can press up against the outer cover and generate significant friction with the outer cover. Because prior art inner elastic tubes are free to slide around within the outer cover when not pressurized, the outer cover—can generate significant friction forces on the inner elastic tube over long distances and place considerable stress on the inner elastic tube. To survive this high stress situation, the prior art inner elastic tubes need to be relatively robust and wall thicknesses are large. The disclosed retractable hose 90, significantly reduces these problems, and elastic tube 94 can have nearly the same diameter as outer cover 26 while still providing small maximum frictional forces. The larger diameter of elastic tube 94 means a large portion of the radial strain is eliminated from the inner elastic tube, leaving more elasticity for longitudinal elongation. This larger diameter, however does tend to increase friction with outer cover 26, because elastic tube 94 is more quickly pressed against outer cover 26 by internal pressure. However, because of the close spacing of the optional periodic bonding systems 91 and/or 93 there are no large distances over which to generate large frictional forces, and thus elastic tube 94 does not need to have thick walls to overcome this friction. These frictional forces are kept small in retractable hose 90 because any misalignment of outer cover 26 only exists over the short distance between adjacent bonding structures (bonding pads 91 and rings 93). Further, the use of lubricant 97 greatly reduces the remaining friction and substantially reduces wear of elastic tube 94. In other words, only small amounts of friction can be generated between tube 94 and cover 26 over the short lubricated distances between bonded areas or rings 91 and 93. Thus, inner elastic tube 94 can be made much thinner than prior art hoses because the maximum friction stress between elastic tube 94 and outer cover 26 is greatly reduced and thus the elastic tube 94 is less likely to be damaged by outer cover 26. Reducing the wall thickness of elastic tube 94 also provides the benefit of reducing the retracting force on retractable hose 90. Prior art hoses at full extension provide considerable retracting biasing from their inner elastic tube which is stretched almost to its breaking point. This strong biasing requires a high internal pressure within these prior art retractable hoses to extend them. It also makes it difficult to use with sprinklers that must be placed out in the middle of the lawn before turning on the water supply. By using a thinner walled inner elastic tube 94, the retractable hose's biasing force can be reduced to make it easier for the user to control the hose.

Figure 4C:
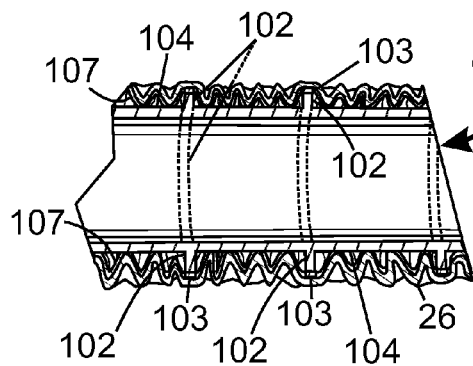
FIG. 4C Elastic retractable stretch hose with a lubricant coating on interior of reinforcement cover between circular ridges 102 formed on the exterior of inner elastic tube 104 which can be bonded periodically to the outer cover 26.

In FIG. 4C, we see a section-view of elastic retractable stretch hose 100 (retractable pressure hose), comprising an inner elastic tube 104, a reinforced outer cover 26 with a coating of lubricant 107 on its interior surface, a plurality of circular bonding ridges 102, and a plurality of optional bonding adhesive rings 103. Retractable hose 100 can be substantially the same as retractable hose 90, except for the bonding ridges 102 protruding from the exterior surface of inner elastic tube 104. Bonding ridges 102 extend away from the surface of inner elastic tube 104 to provide separation of the gripping or bonding surface at adhesive rings 103 from the elastically stretched body portion of inner elastic tube 104. If adhesive rings 103 are not used, bonding ridges 102 act as friction ridges that tend to hold elastic tube 104 in position with respect to outer cover 26 during repeated extensions and retractions. When bonding ridges 102 are bonded to outer cover 26 the bonding ridges help reduce forces on adhesive rings 103 during stretching. Since inner elastic tube 104 might stretch three or more times its relaxed length, separating this stretching portion of elastic tube 104 from adhesive rings 103 with protruding bonding ridges 102 help prevent the adhesive rings 103 from being over stressed. Bonding ridges 102 also provide a narrow contact surface for adhesive 103 to be applied on during manufacturing, which can reduce the portion of outer cover 26 that is bonded in relative position to elastic tube 104 and cannot significantly fold or crumple during retraction of the hose. Bonding ridges 102 can be manufactured as part of inner elastic tube 104 as shown, or comprise a bonded structure on an inner elastic tube similar to inner elastic tube 104. Bonding ridges, like ring shaped bonding ridges 102, can also be added to other inner elastic tube designs disclosed herein. For example, convoluted elastic tube 84 can have a similar bonding ridge defined on the top of its spiral ridge 86 to help secure it to outer cover 26. Similarly, corrugated inner elastic tube 74 can define a plurality of bonding ridge rings similar to bonding ridges 102 at each ridge 76. These ridges can help secure elastic tube 74 to outer cover 26. Finally, similar bonding ridges can be added to smaller diameter elastic tube 24 and to larger diameter elastic tubes 54, 64, and 94 to help bond and/or stabilize the position of the inner elastic tubes with respect to their respective outer cover 26.

Figure 4D:
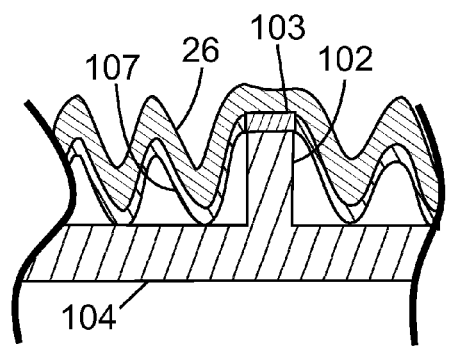
FIG. 4D Close-up section-view of elastic retractable stretch hose 100 seen in FIG. 4C.

In FIG. 4D, we see a close-up section-view of retractable pressure hose 100 where adhesive rings 103 can comprise multiple adhesives that bond strongly to bonding ridges 102, and also to outer cover 26. In this way, outer cover 26 can comprise a significantly dissimilar material and yet still be bonded to inner elastic tube 104 (at the outside edge of bonding ridges 102). Lubricant 107 is deposited on the interior of outer cover 26 between adhesive rings 103. Lubricant 107 can be forced through outer cover 26 using compressed air to push the lubricant to the inside surface of outer cover 26.

Figure 5A:
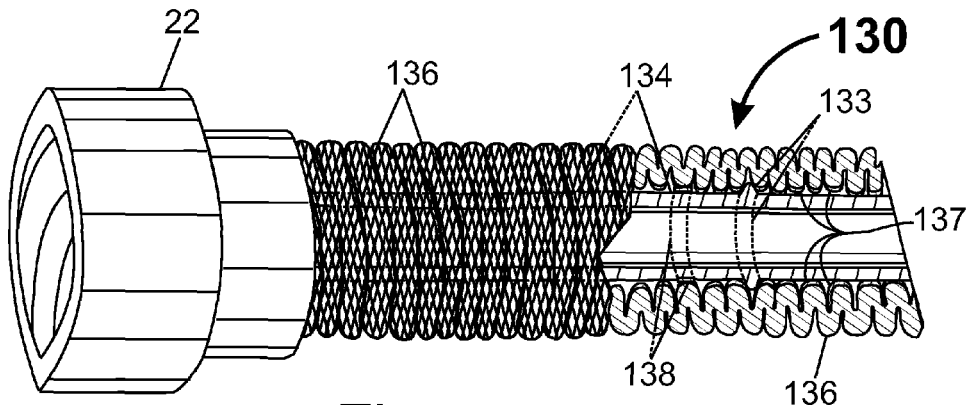
FIG. 5A Elastic retractable bungee hose with lubricant coating on the exterior of a convoluted inner elastic tube and/or on the interior surface of the outer reinforcement cover (Retracted).
Figure 5B:
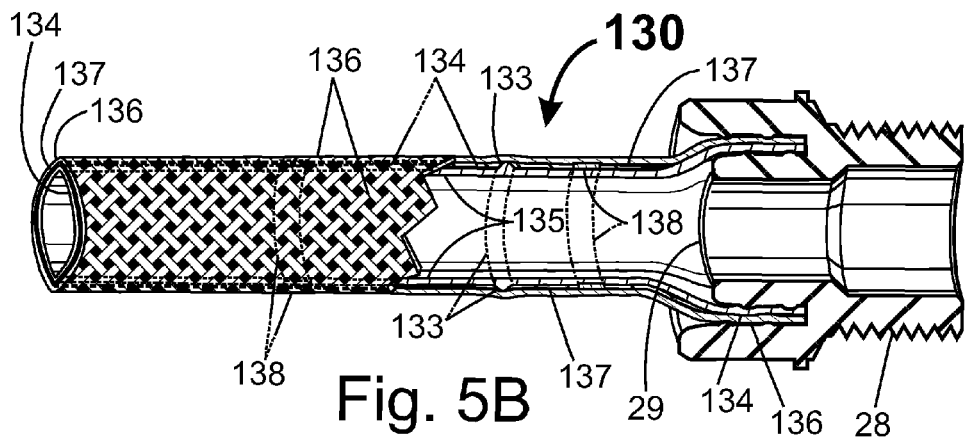
FIG. 5B Elastic retractable bungee hose with lubricant coating on the exterior of a convoluted inner elastic tube and/or on the interior surface of the outer reinforcement cover (Extended).

In FIGS. 5A, and 5B, we see elastic retractable bungee stretch hose 130 comprising an inlet connector 22, an inner elastic tube 134 with a plurality of annular ridge protrusions 133 (optional), a braided outer cover 136, an outlet connector 28, a lubricant 137, and one or more bonding rings 138 (optional) for bonding elastic tube 134 to outer cover 136. FIG. 5A shows bungee hose 130 in its relaxed state, while FIG. 5B shows bungee hose 130 in its pressurized state. FIG. 5A shows the inlet end of bungee hose 130, while FIG. 5B shows the outlet end of hose 130. Inner elastic tube 134 is inserted within hollow braided outer cover 136. Inlet connector 22 and outlet connector 28 are securely connected securely to opposite ends of inner elastic tube 134 and outer cover 136. Inlet connector 22 is designed to connect to a pressurized fluid source or compressed gas source. Inlet connector 22 is designed to transfer fluid (liquid or gas) to an interior channel 135 of elastic tube 134. Outlet connector 28 is designed to transfer fluid (liquid or gas) from interior channel 135 to an external nozzle or other device. Outlet connector 28 is connected to inner elastic tube 134 and outer cover 136 on the opposite end from inlet connector 22, and designed to connect to various nozzles or applicator attachments. Outlet connector 28 is designed to direct fluids or gasses within elastic tube 134 to flow past flow restriction ridge 29 and out the end of bungee hose 130 (see FIG. 5B). Flow restriction ridge 29 helps build pressure within elastic tube 134 to extend hose 130 for use.

In FIGS. 5A-B, lubricant 137 can be coated on the interior surface of braided outer cover 136 and/or the exterior surface of elastic tube 134. Lubricant 137 can be applied in various ways, including but not limited to, coating the interior of outer cover 136 before elastic tube 134 is inserted into outer cover 136 and connectors 22 or 28 are connected, coating elastic tube 134 and then inserting it into outer cover 136 or braiding outer cover 136 around tube 134 with lubricant 137 on its exterior. Lubricant 137 can be infused though outer cover 136 to coat elastic tube 134 and the interior surfaces of braided outer cover 136. Lubricant 137 is designed to reduce friction and wear on elastic tube 134 as the elastic tube slides within cover 136 during extension and retraction of hose 130. Care should be taken during assembly so that lubricant 137 is not scraped all to one end of retractable bungee hose 130. An even coating of lubricant 137 can be applied along the full length of hose 130. Lubricant 137 can be applied to elastic tube 134 before assembly. Various solid and liquid lubricants can be used to reduce friction between elastic tube 134 and outer cover 136. Because of the porous nature of outer cover 136, lubricant placed on outer cover 136 is less likely to be scraped off or shifted within retractable hose 130 during assembly. Many other methods of applying the lubricant can be used to get the lubricant between elastic tube 134 and outer cover 136. The fibrous nature of outer cover 136 tends to keep the lubricant from being dispersed into the environment. Waxes may also be combined with other ingredients or additives to make the wax have various lubricating and other properties. Some of the properties for a wax or soft polymer that might comprise ingredients or additives that make the lubricant sticky and/or gooey so that it can shift with the inner elastic tube and/or outer cover, while at the same time help hold the inner hose in a particular position when the hose is retracted. Other additives might be used to increase the melting temperature (warmer climates) of a wax or soft polymer, and in other situations be used to reduce the melting temperature (colder climates). Other lubricating solid polymers can comprise polymers that can be bonded to the fibers of outer cover 36 and also make a low friction contact interface with the outer surface of the elastic tubes (i.e., elastic tubes 24, 54, 64, 74, 84, 94, 104 and 134). The lubricant may also comprise a solid lubricant that is coated on the yarn or fibers that make up outer cover 136 before outer cover 136 is woven or braided. Lubricant 137 can also comprise substantially the same materials and provide the same functions as lubricants 37, 47, 77, 87, 97 and/or 107 previously discussed.

In FIGS. 5A-B, annular ridges 133 (annular rings) are optional and can be part of inner elastic tube 134 or an attached component. Bonding rings 138 (also pads or other shapes) are optional and can be positioned between elastic tube 134 and outer cover 136 and bond the two components together to provide an even distribution of the outer cover along elastic tube 134. This even distribution helps prevent high stress spots in elastic tube 134 when hose 130 is extending due to internal pressure. Both annular ridges 133 and bonding rings 38 (adhesive rings) can be broken into smaller segments or dots to provide the same function of holding outer cover 136 in place, so that cover 136 has the proper distribution on elastic tube 134. Preferably, either ridges 133 or rings 138 are periodically positioned along the length of bungee hose 130 with a spacing of one ring every two feet or closer. Wider spacing than two feet can be used, but this can reduce the effectiveness of these holding rings at maintaining the position of outer cover 136.

In FIGS. 5A-B, inner elastic tube 134 comprises a tube-shaped body with a plurality of optional annular protrusions along its length. Without protrusions 133, elastic tube 134 can be similar to other elastic tubes described herein. Elastic tubes 134 can be made from any of a number of different elastic materials such as natural rubber, synthetic rubbers, thermal set elastomers, elastic thermal plastics, etc. Many specific polymers and polymer mixtures can exist in each of these elastomer categories. The outside diameter of elastic tube 134 can be chosen so that it gently supports the interior surface of outer cover 136 when retracted. This gives tube 134 room to slide within outer cover 136 while also providing internal support for outer cover 136 so that the exterior of cover 136 can have a relatively smooth cylindrical shape when retracted. Protrusions 133 can be part of elastic tube 134 and comprise annular rings protruding radially outward from the main elastic tube body. Outer cover 136 can deform slightly to accommodate protrusions 133, which helps hold outer cover in place longitudinally when hose 130 is retracted. Protrusions 133 can also comprise protruding dots or segments instead of complete rings. The protrusions in each case can help reduce stressed on inner elastic tube 134 by resisting shifting of outer cover 136 with respect to elastic tube 134 when hose 130 is retracted and not in use. This holding of outer cover 136 longitudinally in place with respect to inner elastic tube 134 can also be accomplished with bonding rings 138 that use an adhesive to bond tube 134 and cover 136 together.

In FIGS. 5A-B, protrusions 133 are optional, as are bonding rings 138, because the proper selection of elastic tube 134, and outer cover 136 tends to make the cover 136 self adjusting on elastic tube 134. The longitudinal compression of cover 136 creates a small spring like force in the compressed yarns that make up cover 136 and tends to evenly space out the folds in outer cover 136 when retracted (see FIG. 5A). That is, the longitudinal forces in the compressed outer cover 136 will tend to shift outer cover 136 back into place longitudinally. The selection of smaller denier yarns can allow a more compressed position, and thus allow greater expanded to retracted length ratios for hose 130.

Figure 5C:
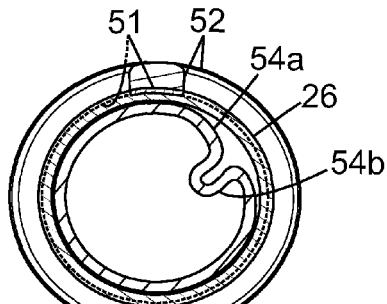
FIG. 5C Section view of Elastic retractable hose seen in FIG. 3A.

In FIG. 5C, we see a section view of hose 50 comprising an alternate elastic tube 54a that replaces elastic tube 54 seen in FIG. 3A. Elastic tube 54a is designed with a natural exterior diameter that is larger than the interior diameter of outer cover 26. Thus, to accommodate the larger diameter elastic tube 54a, tube 54a can fold longitudinally at longitudinal folds 54b to allow elastic tube 54a to fit within outer cover 26 when retracted. Also note that elastic tube 54 (see FIG. 3A) with an exterior diameter that is approximately equal or smaller than the interior diameter of outer cover 26, may also fold longitudinally to fit within outer cover 26 when retracted. Thus, larger elastic tubes can be folded and compressed by outer cover 26 as needed to allow full retraction when hose 50 is depressurized.

Adhesives

As the reader should understand from the previous discussions, the use of bonding agents, bonding structures, and adhesives for bonding specific components of the disclosed retractable pressure hoses together can contribute to the hoses' proper operation and durability. However, the composition of these bonding materials, and the positioning, shaping and applying of the bonding structures can vary greatly. For example, the bonding structures used to bond the inner elastic tube to the outer cover can take the form of bonding strips that follow a spiral path, bonding rings, bonding patches or pads that are periodically positioned not the hose, or even random patterns of bonding patches or pads (see bonding structures 71, 81, 91, 93, 103 and 138). The locations these bonding structures and agents can be applied is also diverse, and can be applied to the inner elastic tube, outer cover, and/or wear strips, buttons, and dots. The bonding materials can also be applied before, during or after the construction of particular parts of the retractable hose. Further, the bonding structures can also be applied in a non-adhesive state to the inner elastic tube, outer cover, and/or wear resistant components and then later activated to bond these components together to complete the retractable hose. The bonding agents themselves (material the bonding structures comprise) can be very diverse and can include, but are not limited to, adhesives, polymer adhesives, UV cured adhesives, thermally cured adhesives, chemically cured adhesives, flexible thermal polymers, soft elastomers, a foamed polymers and/or elastomers, etc. Finally, the bonding structures and bonding agents can comprise the actual hose structure itself, in which case, no additional bonding structures are needed (i.e. inner elastic tube may be thermally and/or mechanically bonded to the outer cover).

Inner Elastic Tube Construction

In FIGS. 1A through 4C, elastic tubes 24, 54, 64, 74, 84, 94, 104 and 134 are shown comprising an elastic tube material that has significant elastic properties. Use of a thermal set polymer can be advantageous because of the low creep of the material when stretched and heated. The elastic tube material can include, but is not limited to, natural latex, synthetic latex, thermal set plastics, thermal set elastomers, other elastomers, and etc.

Manufacturing Methods—FIGS. 1A-B, 2A-C, 3A-C, 4A-B,

In FIG. 1A-B we see prior art elastic-biased stretch hose 20 (retractable hose), which can be manufactured in a number of ways. For example, elastic tube 24 and outer cover 26 can be made separately and then elastic tube 24 slid inside cover 26 and then connectors 22 and 28 bonded to each of their ends. Alternatively, elastic tube 24 can be made separately and outer cover 26 woven around elastic tube 24 to form the hose section. Elastic tube 24 defines an interior channel 25 for conveying fluids or gases entering through inlet connector 22 and exiting through outlet connector 28 seen in FIG. 1B. Retractable hose 20 can include a flow restricting ridge 29 as seen on outlet connector 28. Since the natural length of outer cover 26 is considerably longer than the natural length of inner elastic tube 24, outer cover 26 will be longitudinally compressed when hose 20 is collapsed, and elastic tube 24 will be longitudinally stretched to the length of outer cover 26 when extended. A mandrel system can be used to facilitate these assembly processes.

In FIGS. 2A through 2C, inner elastic tube 24 and woven outer cover 26 are used in retractable hose 30 and 40, which can be assembled similar to above described stretch hose 20. Reinforcement cover 26 can be woven and elastic tube 24 can be extruded prior to assembly. Lubricants 37 and 47 are then coated onto the exterior of elastic tube 24 or interior surface of reinforcement cover 26 before elastic tube 24 is pulled through the interior passage of cover 26. Inlet connector 22 and outlet connector 28 can then be connected to each end of elastic tube 24 and cover 26. The introduction of lubricants 37 and 47 reduces friction between inner elastic tube 24 and outer cover 26 providing less wear and also reducing friction forces on elastic tube 24.

Lubricants 37, 47, 77, 87, 97, 107 and 137 (and possibly others in this document) can be liquid lubricants, solid lubricants, and/or a mixture of solid and liquid lubricants. Solid polymer powders or small beads can also be used as solid lubricants. Some of the lubricant examples include, but are not limited to, oils, paraffin wax, wax mixtures, other soft polymers, Teflon, graphite, solid polymer coatings, elastomer coatings, etc. These lubricants 37, 47, 77, 87, 97, 107 and 137 can be coated on the interior of outer cover 26, on the fibers of outer cover 26, and/or on the exterior of inner elastic tubes 24, 54, 64, 74, 84, 94, 104 and 134. Liquid lubricants can be applied from the exterior through outer covers 26 and 136 to coat the inside surface of covers 26 and 136 because of the porous nature of outer covers 26 and 136. Solid lubricants, like paraffin wax, that can be melted, can also be applied to the exterior of outer covers 26 and 136 and allowed to wick through the fabric of the cover and/or be forced through cover to its inner surface by a number of methods (e.g. a compressed gas). Of the lubricants tested so far, paraffin candle wax has worked the best. The soft solid nature of paraffin provides a smooth lubrication between the two surfaces, and does not wash away or drain away during use, nor while not in use. Wax also easily wicks into the fabric of covers 26 and 136 when heated to its melting point. Wax and other lubricating polymers can also continue to provide protection even after hundreds of hose extension and retraction cycles. Waxes may also be combined with other ingredients or additives to make the wax have various other properties. Some of the properties for a wax or soft polymer that might comprise ingredients or additives that make the wax sticky and/or gooey so that it can shift with the inner elastic tube and/or outer cover, while at the same time help hold the inner hose in a particular position when the hose is retracted. Other additives might be used to increase the melting temperature (warmer climates) of the wax or soft polymer, and in other situations be used to reduce the melting temperature (colder climates). Other lubricating solid polymers can comprise polymers that can be bonded to the fibers of outer covers 26 and 136 and also make a low friction contact interface with the outer surface of the elastic tubes (i.e. elastic tubes 24, 54, 64, 74, 84, 94, 104 and 134). The lubricant may also comprise a solid lubricant that is coated on the yarn or fibers that make up outer covers 26 and 136 before outer covers 26 and 136 are woven or braided.

In FIGS. 3A-C the construction of the retractable hoses 50, 60 and 70 can comprise manufacturing the outer cover 26 and then inserting inner elastic tubes 54, 64, and 74, respectively. Wear strip 52 and wear rings 62 and 72 can be bonded to outer cover 26 before, during, or after this assembly process of inserting elastic tubes 54, 64, and 74. A variety of methods can be used to form and bond wear strip 52 and wear rings 62 and 72 to outer cover 26. First, wear strip 52 and wear rings 62 and 72 can be extruded onto outer cover 26 immediately before insertion of the inner elastic tube. This can comprise extruding these wear structures to cover 26 just after it is woven onto a mandrel. The extruder could move with outer cover 26 as it is being made to provide time to inject the wear rings on that section of outer cover 26 and allow them to cool. After sufficient cooling the extruder would then return to its starting position and injection mold another section of strip 52 or a new set of wear rings 62 and 72 onto cover 26 after it is woven. The shape of the wear strip and wear rings would be determined by the shape of the injection molds. Many wear rings can be injection molded at one time. Second, wear rings 62 and 72 can comprise two or more sections that can be snap, and/or bonded together around outer cover 26 and/or bonded to cover 26 with bonding adhesives 51, 63, etc., with thermal bonding, and/or with other bonding methods. Such snap together wear rings can be injection molded in separate process and later snapped together and bonded to each other and outer cover 26. Adhesives or ultrasonic welding can be used to bond the wear ring sections together. The rest of the assembly of hoses 50, 60, and 70 can be similar to the process discussed previously for retractable hoses 20, 30 and 40.

In FIG. 3C, when manufacturing outer cover 26a, the constriction seen at wear ring 72 (reduced diameter section), can be easily woven directly into this shape of cover 26a by changing the length of fibers or yarns reeled out in the radial direction during the weaving, braiding, or knitting process. For example, when weaving a cylindrical tube, the weaving machine can use both radial and longitudinal yarns to form cover 26a. In a simple hose weaving operation one or more radial yarn(s) can rotate around cover 26a while weaving in and out of a plurality of longitudinal yarns, and thus forming the woven tube shape. (This is close to the process for a braiding machine, where two sets of yarns rotate in opposite directions as they weave in and out of each other, and can also be used). To weave the reduced diameter section of cover 26a at wear ring 72, the length of the radial yarn(s) can be shortened in that area by any of a number of control means (i.e. reducing the rate at which the radial yarns are fed into the weaving machine, reducing the mandrel size that the outer cover is being woven on, and/or other control method). This shortening of the radial yarn(s) forces the woven cover 26a to a smaller diameter. In other manufacturing systems, the radial yarns can comprise a single yarn that oscillates back and forth around the outer cover while weaving (alternating) in and out of the longitudinal yarns as it goes. This method can also produce the constricted section by shortening the length of the radial yarn in those sections of cover 26a by many different control means (i.e. reducing the rate at which the radial yarn are fed into the weaving machine, reducing the mandrel size that the outer cover is being woven on, increasing tension on the radial yarn, and/or other control method).

In FIG. 3A, when manufacturing retractable hose 50, 60, and 70, the wear strip 52, wear rings 62, and wear rings 72, respectively can be bonded to outer cover 26 with a number of methods. Similar bonding methods as described previously can also be used here, comprising, injection molding, extrusion bonding (thermal bonding), adhesive 51, 63, etc. For smaller wear dots (not shown), a plurality of extrusion nozzles can extrude the dots onto cover 26 as the nozzles intermittently move with the cover. This process can be similar to a multi-nozzle hot glue gun that dabs a hot polymer onto cover 26 at specific points. Because of the small size of the dots, they would cool very quickly.

In FIGS. 3C and 4A, corrugated elastic tube 74 and convoluted elastic tube 84 are seen inserted inside outer cover 26, 26a. Elastic tubes 74 and 84 can easily be pulled inside cover 26 or 26a so that connector ends 22 and 28 can be bonded to each end of the cover and inner elastic tube 74 or 84. However, the tight fit of elastic tubes 74 and 84 might place portions of these inner elastic tubes in a potentially damaging misplacement. To relieve any misalignment between outer cover 26 or 26a and inner elastic tubes 74 and 84, the entire hose (both cover 26 and elastic tubes 74 or 84) can be stretched to their full extended length while depressurized (unpressurized), and then pressurized, and then released to retract slowly. The stretching without pressure would narrow inner elastic tubes 74 and 84 so they do not bind against the inside walls of outer cover 26 or 26a and thus are evenly stretched. Some vibration of the hose can be used to insure an even stretch of the inner elastic tube. Then when pressure is applied the inner elastic tube sits against cover 26 or 26a, so that, as pressure is released, both outer cover 26 or 26a and elastic tubes 74 and 84 can retract together in a controlled manner, thereby avoiding dangerous misalignments. This method will also work with other retractable hoses disclosed here. Friction of inner elastic tubes 74 and 84 against outer cover 26 or 26a can then hold them in place during future use. Alternatively, inner elastic tubes 74 and 84 can be bonded to outer cover 26 or 26a at their ridges 76 and 86, respectively.

In FIGS. 3C, 4A, 4B, and 4C-D, inner elastic tubes 74, 84, 94, and 104, respectively, are shown bonded to their hoses' outer covers. Inner elastic tubes 74, 84, 94, and 104 are shown periodically bonded to their hoses' outer covers with adhesives structures 71, 81, 91 & 93, and 103, respectively. For corrugated hoses like inner elastic tube 74 and convoluted hoses like inner elastic tube 84, an adhesive can be coated on the outer ridges of these elastic tubes and bonded to the interior surface of those hoses' respective outer covers. The adhesive used in this type of bonding should preferably be very flexible so that it can stretch and move with the inner elastic tubes. Alternatively, bonding adhesives for structures 71, 81, 91 & 93, and 103 can be applied to the interior surface of outer cover 26 or 26a while it is being manufactured and then activated to bond outer cover 26 or 26a to the adhesive structures' respective inner elastic tubes. This provides less control as to where cover 26 or 26a is bonded on a corrugated and convoluted elastic tube like elastic tubes 74 and 84, but can still allow the finished hose to function properly. A more controlled method of bonding elastic tubes 74, 84, 94, and 104 can comprise inserting the inner elastic tube into cover 26 or 26a and properly positioning the elastic tube and reinforcement cover. Then because outer cover 26 or 26a can be porous, adhesives can be injected through outer cover 26 or 26a and onto inner elastic tubes 74, 84, 94, and 104 to bond them to their respective outer covers. The adhesive used can comprise nearly any polymer that will bond to both elastic tubes 74, 84, 94, and 104 and their respective outer covers. This last method can be more labor intensive if not automated.

In FIGS. 5A and 5B, braided outer cover 136, and inner elastic tube 134 can be assembled similar to above described stretch hoses 30 or 40. Other methods are possible, where reinforcement outer cover 136 can be braided directly onto elastic tube 134 which is made separately. Lubricant 137 can be coated onto the exterior of elastic tube 134 and/or interior surface of outer cover 136 before elastic tube 134 is pulled through interior channel passage of cover 136. Inlet connector 22 and outlet connector 28 can then be connected to each end of elastic tube 134 and outer cover 136. The introduction of lubricant 137 between elastic tube 134 and cover 136 reduces the friction between their surfaces and provides smaller friction forces and less wear on elastic tube 134.

Operational Description—FIGS. 1A through 5B

In FIGS. 1A-B, prior art retractable hose 20 is seen with inner elastic tube 24, which has a relatively thick wall to provide strength to resist water pressure and resist friction against outer cover 26. The diameter of elastic tube 24 is approximately half the diameter of outer cover 26 so that elastic tube 24 does not begin to press significantly against the interior surface of outer cover 26 until considerable internal pressure is already applied, and retractable hose 20 has started to extend. This prevents significant friction from forming between elastic tube 24 and outer cover 26 until after retractable hose 20 is partially extended. Restriction 29 produces a back pressure within elastic tube 24 to increase internal pressure. Nozzle accessories (not shown) which can be attached to outlet connector 28 can provide additional back pressure to extend hose 20. As pressure increases, elastic tube 24 presses up against outer cover 26 and the hose continues to expand longitudinally. As pressure further increases, elastic tube 24 slides within outer cover 26 until outer cover 26 reaches its full length and hose 20 is at its full length. When water pressure is removed, the elastic biasing tension in elastic tube 24 causes retractable hose 20 to retract and force water out of elastic tube 24.

In FIGS. 2A-B, retractable hose 30 is seen in its collapsed and extended states, respectively. In its collapsed state, as seen in FIG. 2A, elastic tube 24 is substantially relaxed with cover 26 folded and compressed longitudinally around tube 24. As water pressure is introduced into connector 22 and inner channel 25, elastic tube 24 begins to extend longitudinally and expand radially. Lubrication 37 makes contact with the interior of cover 26 and helps reduce friction and chafing of tube 24. As pressure increases, elastic tube 24 presses with more force against outer cover 26 and hose 30 continues to lengthen. In portions of hose 30, elastic tube 24 will need to slide with respect to outer cover 26 to allow cover 26 to straighten completely. Lubricant 37 can provide a low friction surface for tube 24 and cover 26 to slide with respect to each other. Lubricant 37 can help reduce wear of elastic tube 24 as it slides with respect to cover 26 by reducing stresses on tube 24. Solid lubricants such as paraffin waxes are particularly good at reducing wear and also reducing friction between elastic tube 24 and a woven outer cover 26. The wax tends to remain within cover 26 during long term use and in tests actually appears to work better and better as the wax is worked into the fibers of cover 26.

In FIG. 2C, retractable hose 40 can operate in substantially the same way as retractable hose 30, but lubrication 47 (film, layer or coating) is first applied to the interior of outer cover 26 instead of the inner elastic tube. This helps impregnate the fibers of cover 26 with lubricant 37 and provide a consistent lubricated surface for elastic tube 24 to slide against. Melting paraffin wax into the inner surface of reinforcement cover 26 provides smooth extension of the hose without coiling from the first use. In tests, wax dust or wax rubbings on the interior of cover 26 take a couple of extensions and retractions to work the wax (lubricant 37) in the fibers of outer cover 26 and provide a smooth non-coiling operation of the hose.

In FIGS. 3A-B, retractable hoses 50 and 60 are seen comprising wear resistant protective strip 52, and wear resistant rings 62, respectively. In operation, when outer cover 26 is extended as shown in FIGS. 3A-B, wear strip 52, and wear rings 62 can make contact with the ground or other flat surface before outer cover 26. Thus, during use, cover 26 can be protected from damage by wear structures 52 and 62, by making first contact with abrasive and wearing surfaces. When not in use, hoses 50 and 60 are retracted with the coils of wear strip 52 collapsed next to one another, and wear rings 62 are collapsed next to each other to protect outer cover 26 from damage during storage. The wear strip 52 and wear rings 62 also help protect outer cover 26 from UV radiation (Ultraviolet radiation) when collapsed. Wear structures 52 and 62, can provide UV stabilizing agents such as carbon black, aluminum oxide and other compounds to provide strong UV protection.

In FIGS. 3C and 4A, retractable hoses 70 and 80 are shown with corrugated and convoluted inner elastic tubes 74 and 84 respectively. In each example, inner elastic tubes 74, and 84 are shown in their natural retracted or relaxed state. However, only cover 26 in FIG. 4A is shown in its collapsed state while cover 26a in FIG. 3C is shown fully extended to show the diameter relationship between the natural state of elastic tube 74 and the pressurized size of outer cover 26a. Collapsed outer cover 26 (retracted position) seen in FIG. 4A shows one possible folded, retracted, or collapsed state of outer cover 26. During operation, when pressure is introduced into retractable hoses 70, and 80 (elastic tubes 74, and 84, respectively) only a small amount of pressure is needed to begin extending the ridged nature of these hoses. Ridges 76 and 86 quickly begin pressing against the inner surface of cover 26. Elastic tubes 74 and 84 can then stretch to about twice their relaxed state with a relatively small amount of pressure (small amount of longitudinal strain in the inner elastic tubes). As greater pressure is applied the inner elastic tubes will substantially flatten out against outer cover 26 or 26a. When retracting, ridges 76 and 86 tend to grip the inner wall of cover 26 or 26a (even without bonding) longer than the valley portions 79 and 89 to allow slippage of cover 26 or 26a between adjacent ridges to reduce stress. At the same time, valleys 79 and 89 contract radially to make room for cover 26 or 26a as it folds and crumples longitudinally. Lubricants 77 and 87 on elastic tubes 74 and 84, respectively, reduce friction to prevent damage to elastic tubes 74 and 84. In alternate designs, Lubricants 77 and 87 can be coated on outer covers 26 or 26a (also cover 136, see FIGS. 5A-B) instead of on the inner elastic tube during manufacturing.

In FIGS. 3B and 4A-B, retractable hoses 70, 80 and 90 are shown with periodic bonding structures 71, 81, and 91 & 93, which bond inner elastic tubes 74, 84, and 94, respectively, to their outer covers. This periodic bonding of the inner elastic tube to outer cover forces the outer cover to fold equal portions of cover 26 between each bonded section. When extending and retracting, outer cover 26 can only make small shifts away from its extended position on elastic tubes 74, 84, and 94. Because of this, only small friction forces are generated between elastic tubes 74, 84, and 94 and outer cover 26. And with small friction forces the wall thickness of elastic tubes 74, 84, and 94 can be made thinner than prior art retractable hoses. Because the wall thickness of the inner elastic tubes can be reduced, retractable hoses 70, 80 and 90 can have a significantly reduced retracting force on the hose when fully extended. Retractable hoses 70 and 80 can further reduce the retracting force because of their corrugated and convoluted shapes, respectively.

In FIGS. 4C-D, inner elastic tube 104 solves one potential problem with retractable hoses 70, 80 and 90, where their highly inner elastic tubes 74, 84, and 94 can be bonded to the substantially non-elastic outer cover 26 with bonding structures 81, 91, and 93. This bonding of an inner elastic tube to a non-elastic outer cover can provide the benefit of an interface that can distribute strain created during stretching. There are many ways of distributing strain. In the example seen in FIGS. 4C-D, longitudinal strain in elastic tube 104 is distributed by using elastic bonding ridges 102 which can stretch at its inner diameter with elastic tube 104 and remain substantially fixed in shape at its outer diameter which is bonded to outer cover 26. Thus, during operation, when hose 100 is extended, the inner and outer diameter portions of ridges 102 can be stretched by different amounts. At the inner diameter of ridges 102, the ridges are longitudinally highly strained, while at the outer diameter of ridges 102 where it is attached to cover 26, the ridges are substantially longitudinally unstrained. The result is the bonding adhesive rings 103 do not have to sustain high stresses or strains during normal operation of hose 100.

In FIGS. 5A-B, as water pressure is introduced into connector 22 and inner channel 135, elastic tube 134 begins to expand longitudinally and radially. The interior of outer cover 136 is easily deformed and begins to take on a cylindrical shape. As pressure increases, elastic tube 134 begins to press against outer cover 136, and eventually straightens outer cover 136 into a cylinder shaped tube. As elastic tube 134 is forced against outer cover 136, lubricant layer 137 helps reduce friction and chafing of elastic tube 134 on outer cover 136. Once inner elastic tube 134 has pressed outer cover 136 into a cylindrical shape, elastic tube 134 and outer cover 136 can then expand together as bungee hose 130 continues to extend lengthwise as internal pressure increases. Outer cover 136 can smooth-out and lay flat against inner elastic tube 134 long before the bungee hose reaches its fully extended length. As more pressure is applied, bungee hose 130 continues to lengthen as outer cover continues growing longitudinally with inner elastic tubes 134. Once full contact is made between tube 134 and cover 136, further extension of elastic tube 134 and outer cover 36 produces very little sliding of tube 134 with respect to outer cover 136. However, lubricant 137 can provide a low friction surface interface between tube 134 and cover 136 to lubricate the small shifts in the angle of the yarns comprising cover 136 after making contact as well as the longitudinal sliding of cover 136 with respect to tube 134. Lubricant 137 can help reduce wear of elastic tube 134 as it slides with respect to cover 136 by reducing stresses on tube 134. Solid lubricants such as paraffin wax are particularly good at reducing wear and also reducing friction between elastic tube 134 and a woven outer cover 136. The wax tends to remain within cover 136 during long term use, and in tests, actually appears to work better and better as the wax is worked into the fibers of cover 136.

RAMIFICATIONS, AND SCOPE

The use of solid and liquid lubricants between the outer cover and the inner elastic tube of a retractable hose can provide longer life, smoother operation, and larger expansion ratios for retractable hoses. Paraffin wax was found to be a very durable coating lubricant that effectively reduces chafing of the exterior of the inner elastic tube, and also overall friction. The addition of friction points and bond zones further reduces overall friction and range of motion of the elastic tube.

Although the above description contains many specifications, these should not be viewed as limiting the scope of protection provided by this document, or by any related document. Instead, the above description should be considered as illustrating some of the presently preferred embodiments of the disclosed technology. For example, many alternate solid and liquid lubricants can be used. The choice of material for the inner elastic tube will often determine what lubricants are compatible with that material. Also, many additional combinations of outer cover, lubricant, inner elastic tube, and bonding methods are possible. Also, the corrugated and convoluted inner elastic tubes can comprise other cross-sectional shapes beside the sinusoidal shaped cross-sections shown. Finally, while paraffin wax was found to very effective in reducing friction and wear within an elastically retractable stretch hose other lubricants both solid and liquid may be found to be better for a given combination of outer cover and inner elastic tube.

Thus, the scope of protection provided by this document should not be limited to the above examples but should be determined from the following claims.

I claim:

1. An extendable hose having a first end and a second end and configured to extend along its longitudinal axis when an extending force exceeds a retracting force and to retract when the retracting force exceeds the extending force, the extendable hose comprising:
    a) a tube-shaped outer cover with an extended length and a retracted length, wherein the outer cover can extend along the longitudinal axis of the extendable hose to the extended length and retract along the longitudinal axis of the extendable hose to the retracted length;
    b) an inner elastic hose capable of stretching along the longitudinal axis of the extendable hose to at least two times its natural length and having a tendency to return to its natural length when stretched, wherein:
        i) the inner elastic hose is positioned inside of the tube-shaped outer cover; and
        ii) the retracting force is a force provided by the tendency of the inner elastic hose to return to its natural length when stretched;
    c) an input connector attached to the first end of the extendable hose and designed to be removably attached to a source of pressurized fluid;
    d) an output connector attached to the second end of the extendable hose and designed to removably connect to a flow restricting device for generating the extending force by increasing a pressure differential between fluid within the inner elastic hose and an ambient environment at lower pressure than the fluid within the inner elastic hose; and
    e) a lubricant disposed for reducing chafing between the inner elastic hose and the tube-shaped outer cover;
    wherein the lubricant is a solid lubricant; and
    wherein the lubricant is paraffin wax.

2. The extendable hose of claim 1, wherein the lubricant comprises lubricant coated on one or more surfaces taken from a group of surfaces consisting of:
    a) an exterior surface of the inner elastic tube; and
    b) an interior surface of the tube-shaped outer cover.

3. The extendable hose of claim 2, wherein the lubricant further comprises a powder disposed between the exterior surface of the inner elastic tube and the interior surface of the tube-shaped outer cover.

4. The extendable hose of claim 3, wherein the lubricant comprises:
    a) a wax coating on at least the interior surface of the tube-shaped outer cover; and
    b) wax powder disposed between the exterior surface of the inner elastic tube and the interior surface of the tube-shaped outer cover.

5. The extendable hose of claim 1, wherein the inner elastic hose has an exterior surface with a natural diameter having a relationship to a natural diameter of an interior surface of the tube-shaped outer cover selected from the group of relationships consisting of:
 a) greater than 60% of the natural diameter of the interior surface of the tube-shaped outer cover;
 greater than 70% of the natural diameter of the interior surface of the tube-shaped outer cover;
 c) greater than 80% of the natural diameter of the interior surface of the tube-shaped outer cover;
 d) greater than 90% of the natural diameter of the interior surface of the tube-shaped outer cover;
 e) greater than 95% of the natural diameter of the interior surface of the tube-shaped outer cover;
 f) greater than 100% of the natural diameter of the interior surface of the tube-shaped outer cover;
 g) greater than 105% of the natural diameter of the interior surface of the tube-shaped outer cover; and
 h) greater than 110% of the natural diameter of the interior surface of the tube-shaped outer cover.

6. The extendable hose of claim 5, wherein
 a) the natural diameter of the exterior surface of the inner elastic hose is greater than 100% of the natural diameter of the interior surface of the tube-shaped outer cover;
 b) the inner elastic hose is adapted to fold lengthwise inside the tube-shaped outer cover along the longitudinal axis of the extendable hose when the extendable hose is retracted to its natural length.

7. The extendable hose of claim 1, wherein
 a) the inner elastic hose is disposed inside the outer cover; and
 b) the outer cover is adapted to respond to an external force applied when the outer cover is at the extended length by:
  i) longitudinally extending to a stretched length beyond the extended length; and
  ii) radially contracting to a stretched diameter smaller than an extended diameter, wherein the extended diameter is the outer cover's diameter when the outer cover is at the extended length.

8. The extendable hose of claim 7, wherein the extendable hose is adapted to, when the inner elastic tube contracts to its natural length, compress the outer cover into a plurality of equally spaced repeating valleys and ridges.

9. The extendable hose of claim 8, wherein the inner elastic hose has an outer diameter at its natural length about equal to an inner diameter of the valleys from the plurality of repeating valleys and ridges.

10. The extendable hose of claim 1, wherein the inner elastic hose comprises an outer surface comprising:
 a) one or more portions engaged with the tube-shaped outer cover and disposed between the first and second ends of the hose; and
 b) one or more portions freely movable with respect to the tube-shaped outer cover and disposed between the first and second ends of the hose.

11. The extendable hose of claim 10, wherein the lubricant is disposed on the portions of the inner elastic hose which are freely movable with respect to the tube-shaped outer cover and not on the portions of the inner elastic hose which are engaged with the tube-shaped outer cover.

12. The extendable hose of claim 10 wherein each of the one or more portions of the outer surface of the inner elastic hose which is engaged with the tube-shaped outer cover and disposed between the first and second ends of the extendable hose is bonded to the tube-shaped outer cover.

13. The extendable hose of claim 10 wherein each of the one or more portions of the outer surface of the inner elastic hose which is engaged with the tube-shaped outer cover and disposed between the first and second ends of the extendable hose:
 a) has a stretched radius when the extendable hose is extended and a natural radius when the extendable hose is retracted, wherein the natural radius is less than the extended radius and wherein the extended radius is about equal to an inner radius of the tube-shaped outer cover; and
 b) is frictionally engaged with the tube-shaped outer cover when the extendable hose is extended.

14. The extendable hose of claim 13, wherein:
 a) the tube-shaped outer cover has an unrestricted pressurized inner radius, a restricted pressurized inner radius, and an unrestricted pressurized outer radius;
 b) for each of the one or more portions of the outer surface of the inner elastic hose which is engaged with the tube-shaped outer cover and disposed between the first and second ends of the extendable hose, the inner radius of the tube-shaped outer cover which is about equal to the extended radius of that portion of the inner hose is the restricted pressurized inner radius;
 c) the unrestricted pressurized inner radius of the tube-shaped outer cover is greater than the restricted pressurized inner radius of the tube-shaped outer cover, and is less than the unrestricted pressurized outer radius of the tube-shaped outer cover;
 d) the extendable hose comprises a plurality of rings, wherein each ring from the plurality of rings:
  i) has an inside diameter smaller than the unrestricted pressurized inner radius of the tube-shaped outer cover of the extendable hose;
  ii) has an outside diameter larger than the unrestricted pressurized outer radius of the tube-shaped outer cover of the extendable hose; and
  iii) is disposed outside of the tube-shaped outer cover of the extendable hose and at a location along the length of the tube-shaped outer cover where one of the one or more portions of the inner hose is engaged with the tube-shaped outer cover.

15. The extendable hose of claim 10, wherein the inner elastic hose is a constant radius cylindrical hose.

16. The extendable hose of claim 1, wherein the inner elastic hose has a shape comprising a plurality of valleys and ridges, wherein the shape is selected from a group of shapes consisting of:
 a) a convoluted shape; and
 b) a corrugated shape.

17. The extendable hose of claim 16, wherein:
 a) the tube-shaped outer cover has an unrestricted pressurized inner radius, a restricted pressurized inner radius, and an unrestricted pressurized outer radius;
 b) the extendable hose comprises a plurality of rings, wherein each ring from the plurality of rings:
  i) has an inside diameter smaller than the unrestricted pressurized inner radius of the tube-shaped outer cover of the extendable hose;
  ii) has an outside diameter larger than the unrestricted pressurized outer radius of the tube-shaped outer cover of the extendable hose; and
  iii) is disposed over a valley from the plurality of valleys of the inner elastic hose.

18. An extendable hose having a first end and a second end and configured to extend along its longitudinal axis when an extending force exceeds a retracting force and to retract when the retracting force exceeds the extending force, the extendable hose comprising:

a) a tube-shaped outer cover with an extended length and a retracted length, wherein the outer cover can extend along the longitudinal axis of the extendable hose to the extended length and retract along the longitudinal axis of the extendable hose to the retracted length;
b) an inner elastic hose capable of stretching along the longitudinal axis of the extendable hose to at least two times its natural length and having a tendency to return to its natural length when stretched, wherein:
 i) the inner elastic hose is positioned inside of the tube-shaped outer cover; and
 ii) the retracting force is a force provided by the tendency of the inner elastic hose to return to its natural length when stretched;
c) an input connector attached to the first end of the extendable hose and designed to be removably attached to a source of pressurized fluid;
d) an output connector attached to the second end of the extendable hose and designed to removably connect to a flow restricting device for generating the extending force by increasing a pressure differential between fluid within the inner elastic hose and an ambient environment at lower pressure than the fluid within the inner elastic hose; and
e) a lubricant disposed for reducing chafing between the inner elastic hose and the tube-shaped outer cover;
wherein the inner elastic hose comprises an outer surface comprising:
A) one or more portions engaged with the tube-shaped outer cover and disposed between the first and second ends of the hose; and
B) one or more portions freely movable with respect to the tube-shaped outer cover and disposed between the first and second ends of the hose; and
wherein each of the one or more portions of the outer surface of the inner elastic hose which is engaged with the tube-shaped outer cover and disposed between the first and second ends of the extendable hose is bonded to the tube-shaped outer cover.

19. An extendable hose having a first end and a second end and configured to extend along its longitudinal axis when an extending force exceeds a retracting force and to retract when the retracting force exceeds the extending force, the extendable hose comprising:
a) a tube-shaped outer cover with an extended length and a retracted length, wherein the outer cover can extend along the longitudinal axis of the extendable hose to the extended length and retract along the longitudinal axis of the extendable hose to the retracted length;
b) an inner elastic hose capable of stretching along the longitudinal axis of the extendable hose to at least two times its natural length and having a tendency to return to its natural length when stretched, wherein:
 i) the inner elastic hose is positioned inside of the tube-shaped outer cover; and
 ii) the retracting force is a force provided by the tendency of the inner elastic hose to return to its natural length when stretched;
c) an input connector attached to the first end of the extendable hose and designed to be removably attached to a source of pressurized fluid;
d) an output connector attached to the second end of the extendable hose and designed to removably connect to a flow restricting device for generating the extending force by increasing a pressure differential between fluid within the inner elastic hose and an ambient environment at lower pressure than the fluid within the inner elastic hose; and
e) a lubricant disposed for reducing chafing between the inner elastic hose and the tube-shaped outer cover;
wherein the inner elastic hose has a shape comprising a plurality of valleys and ridges, wherein the shape is selected from a group of shapes consisting of:
A) a convoluted shape; and
B) a corrugated shape.

20. The extendable hose of claim 19, wherein:
a) the tube-shaped outer cover has an unrestricted pressurized inner radius, a restricted pressurized inner radius, and an unrestricted pressurized outer radius;
b) the extendable hose comprises a plurality of rings, wherein each ring from the plurality of rings:
 i) has an inside diameter smaller than the unrestricted pressurized inner radius of the tube-shaped outer cover of the extendable hose;
 ii) has an outside diameter larger than the unrestricted pressurized outer radius of the tube-shaped outer cover of the extendable hose; and
 iii) is disposed over a valley from the plurality of valleys of the inner elastic hose.

21. The extendable hose of claim 1, wherein the lubricant comprises a powder disposed between the exterior surface of the inner elastic tube and the interior surface of the tube-shaped outer cover.

22. The extendable hose of claim 1, wherein the outer cover has a corrugated shape.

* * * * *

UNITED STATES PATENT AND TRADEMARK OFFICE
CERTIFICATE OF CORRECTION

| | |
|---|---|
| PATENT NO. | : 9,127,791 B2 |
| APPLICATION NO. | : 14/491735 |
| DATED | : September 8, 2015 |
| INVENTOR(S) | : Gary Dean Ragner |

Page 1 of 1

It is certified that error appears in the above-identified patent and that said Letters Patent is hereby corrected as shown below:

Claims
    Column 29, Claim 5, line 6, reads "...greater than 70%..."; which should be deleted and replaced with "...b) greater than 70%...."

Signed and Sealed this
Eighth Day of March, 2016

Michelle K. Lee
*Director of the United States Patent and Trademark Office*